Sept. 7, 1943.  A. H. DICKINSON  2,328,623
DIVIDING MACHINE
Filed June 4, 1942  15 Sheets-Sheet 2
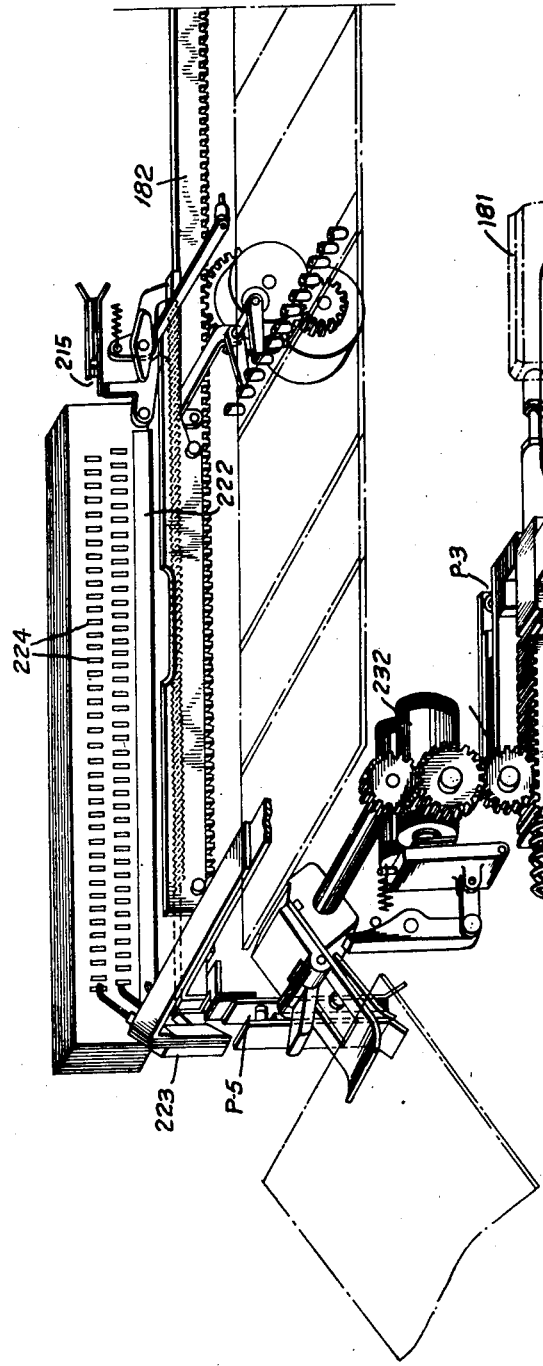
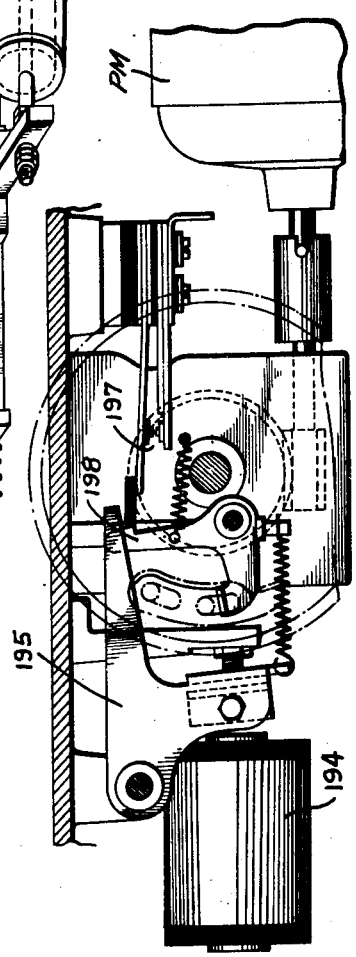
INVENTOR
A. H. Dickinson
BY
W. M. Wilson
ATTORNEY Sept. 7, 1943.   A. H. DICKINSON   2,328,623
DIVIDING MACHINE
Filed June 4, 1942   15 Sheets-Sheet 3
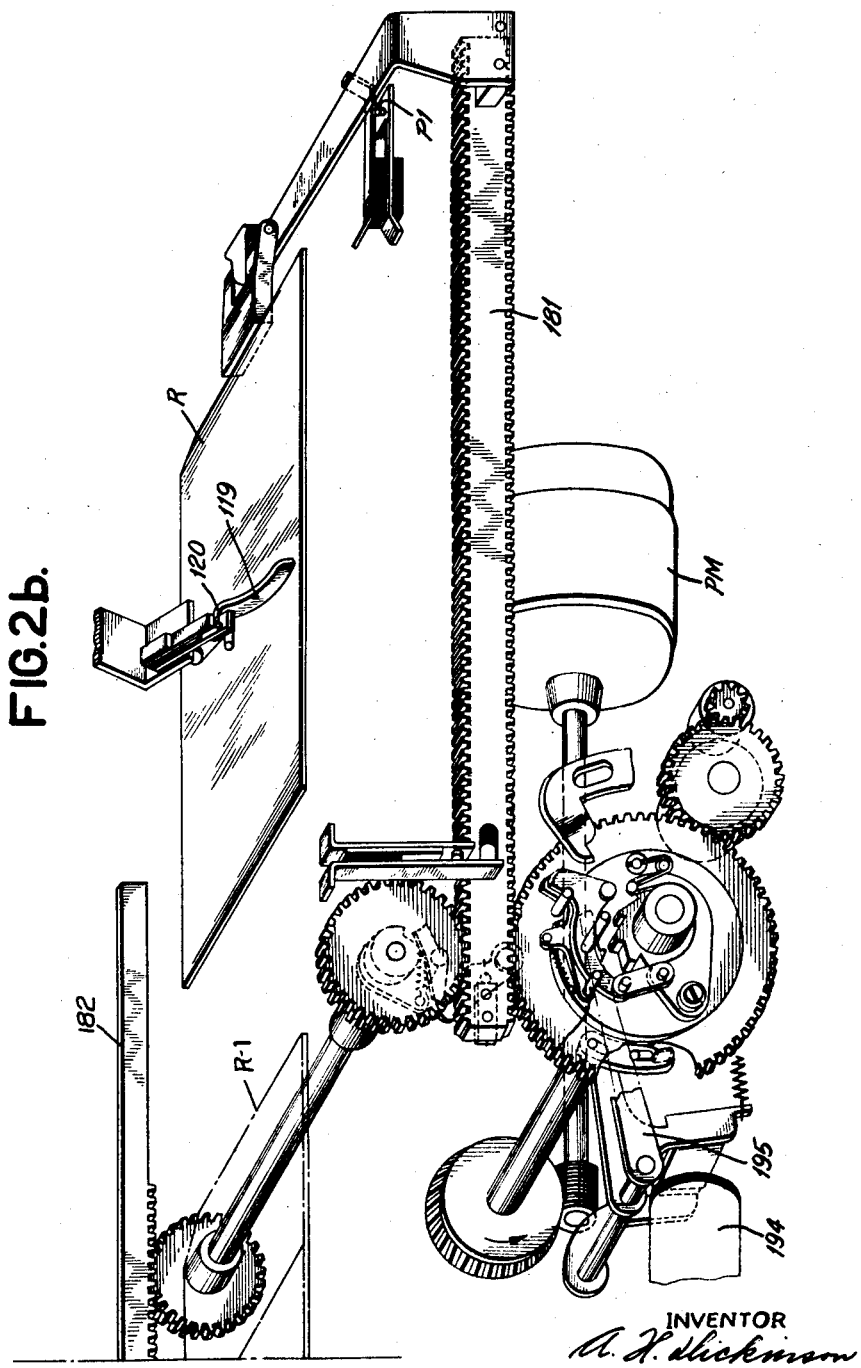

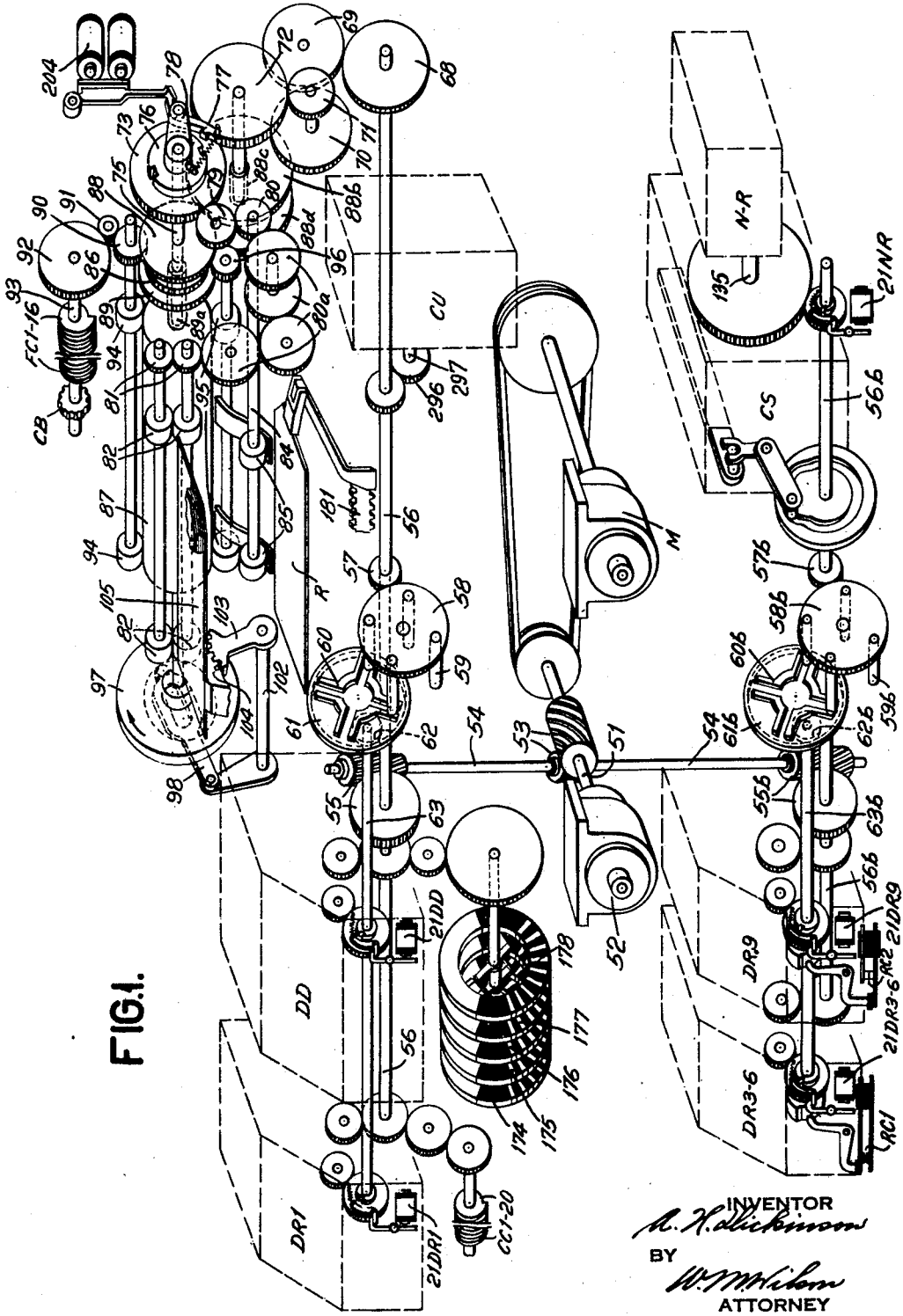

Sept. 7, 1943.　　　A. H. DICKINSON　　　2,328,623
DIVIDING MACHINE
Filed June 4, 1942　　　15 Sheets-Sheet 4

INVENTOR
A. H. Dickinson
BY
ATTORNEY

Sept. 7, 1943.  A. H. DICKINSON  2,328,623
DIVIDING MACHINE
Filed June 4, 1942  15 Sheets-Sheet 5
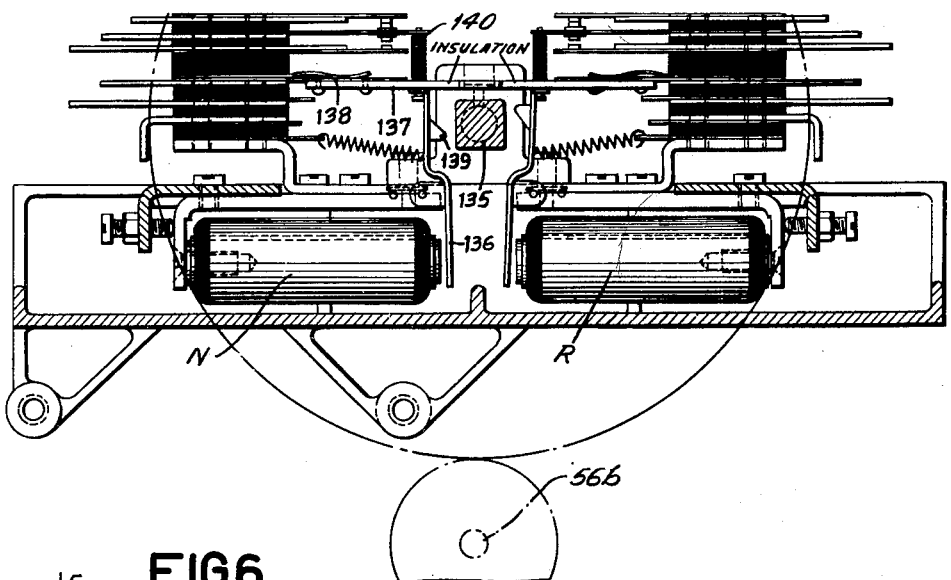
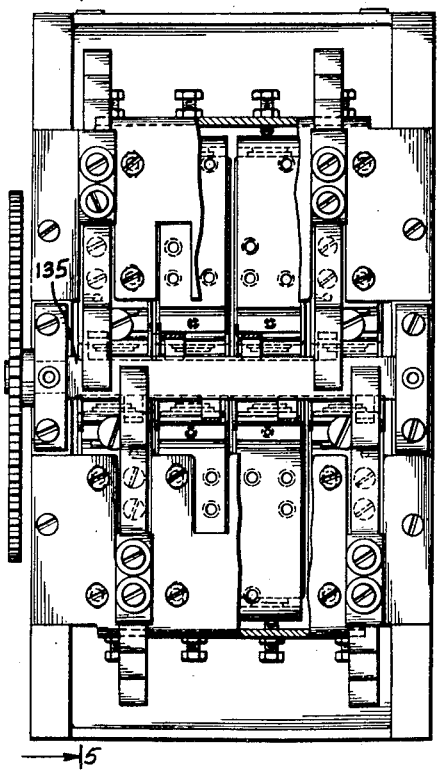
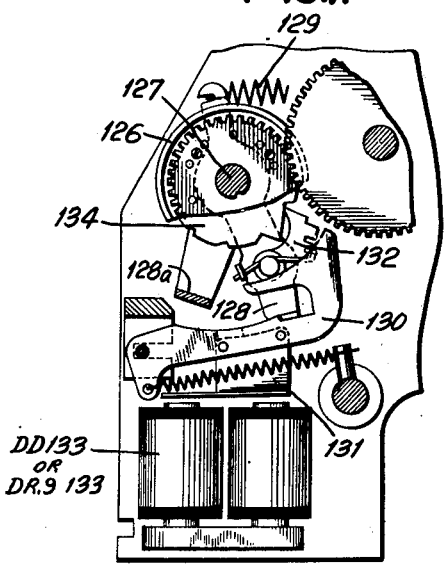
INVENTOR
A. H. Dickinson
BY
W. M. Wilson
ATTORNEY Sept. 7, 1943.  A. H. DICKINSON  2,328,623
DIVIDING MACHINE
Filed June 4, 1942  15 Sheets-Sheet 6
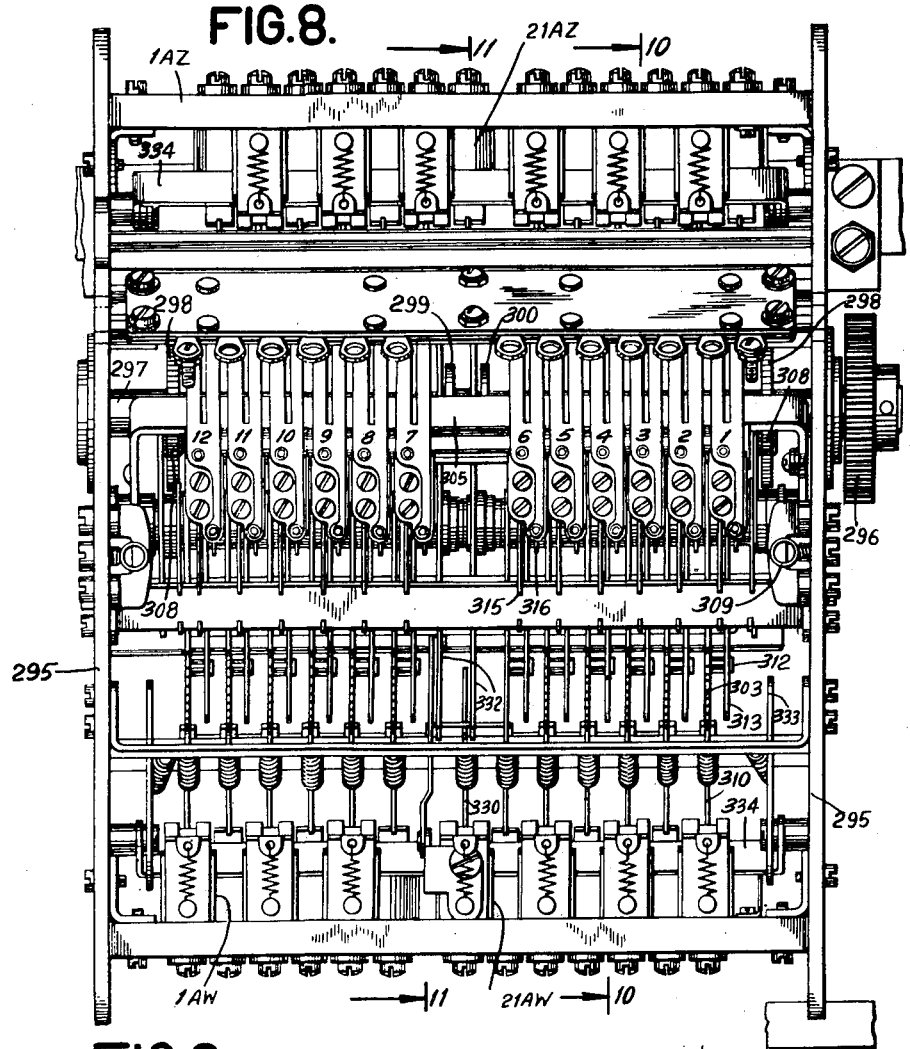
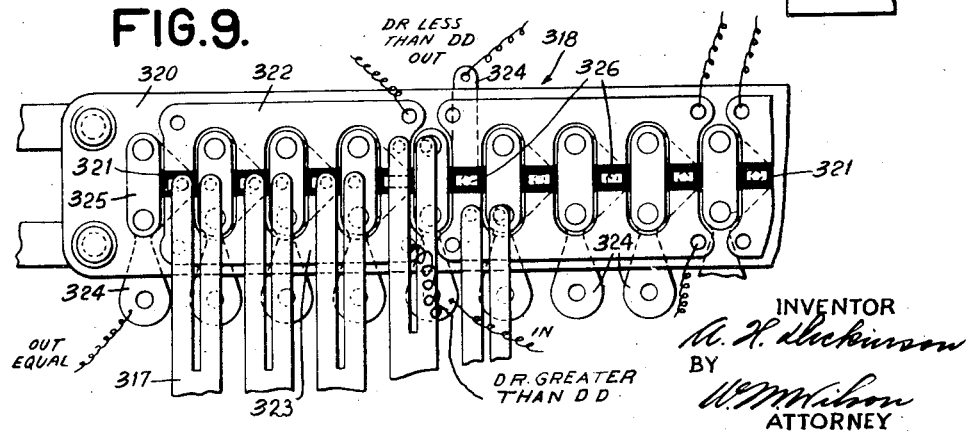

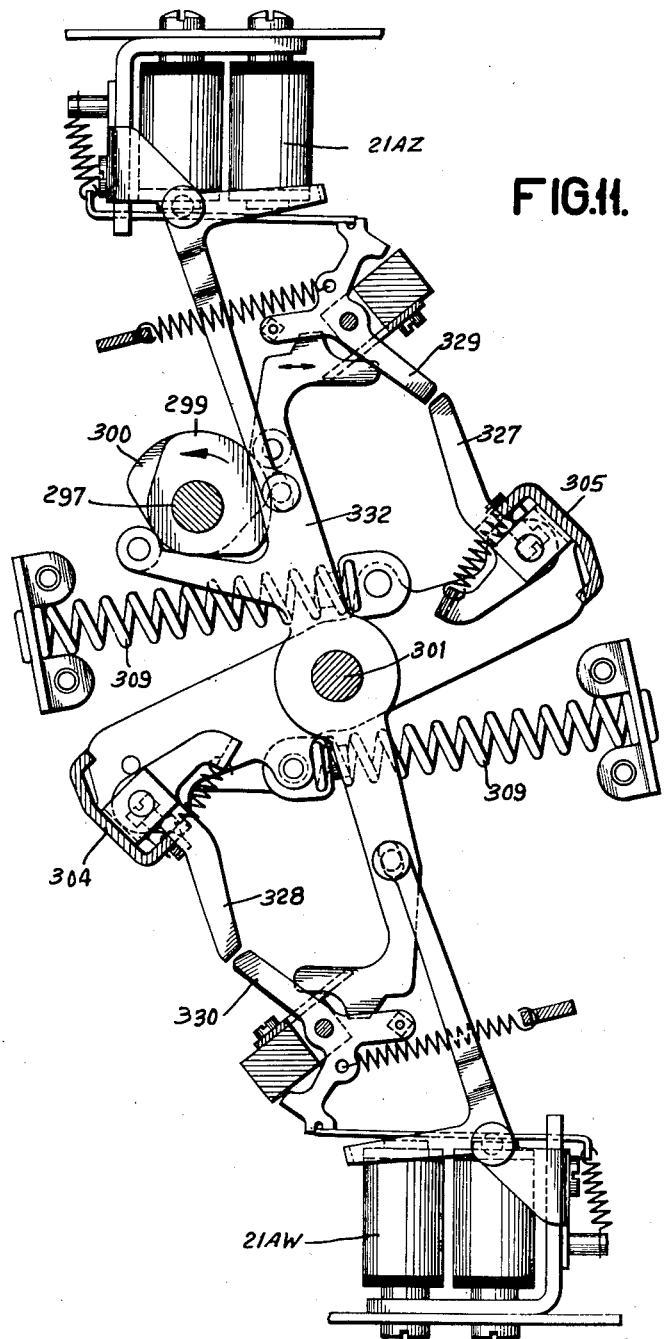

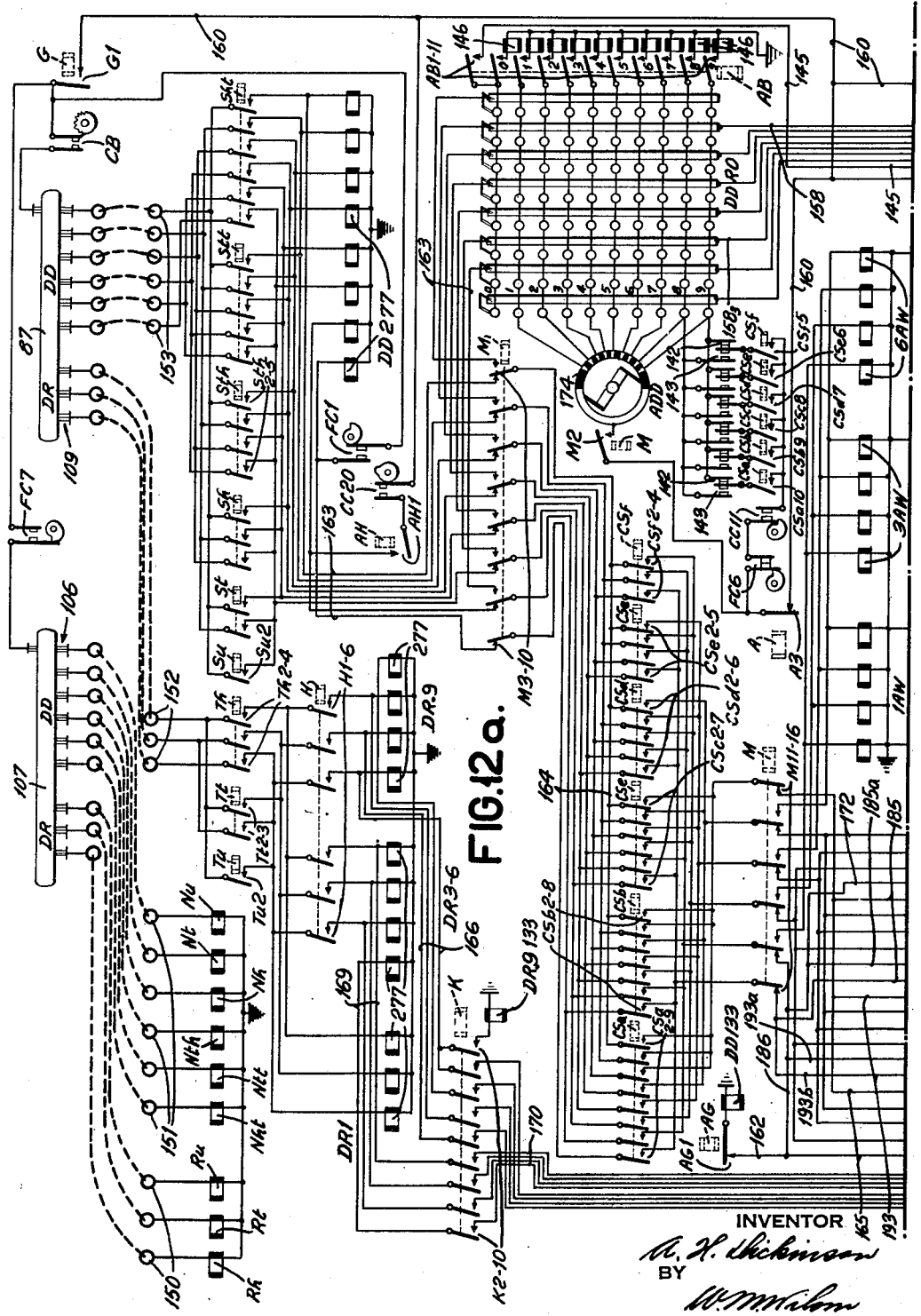

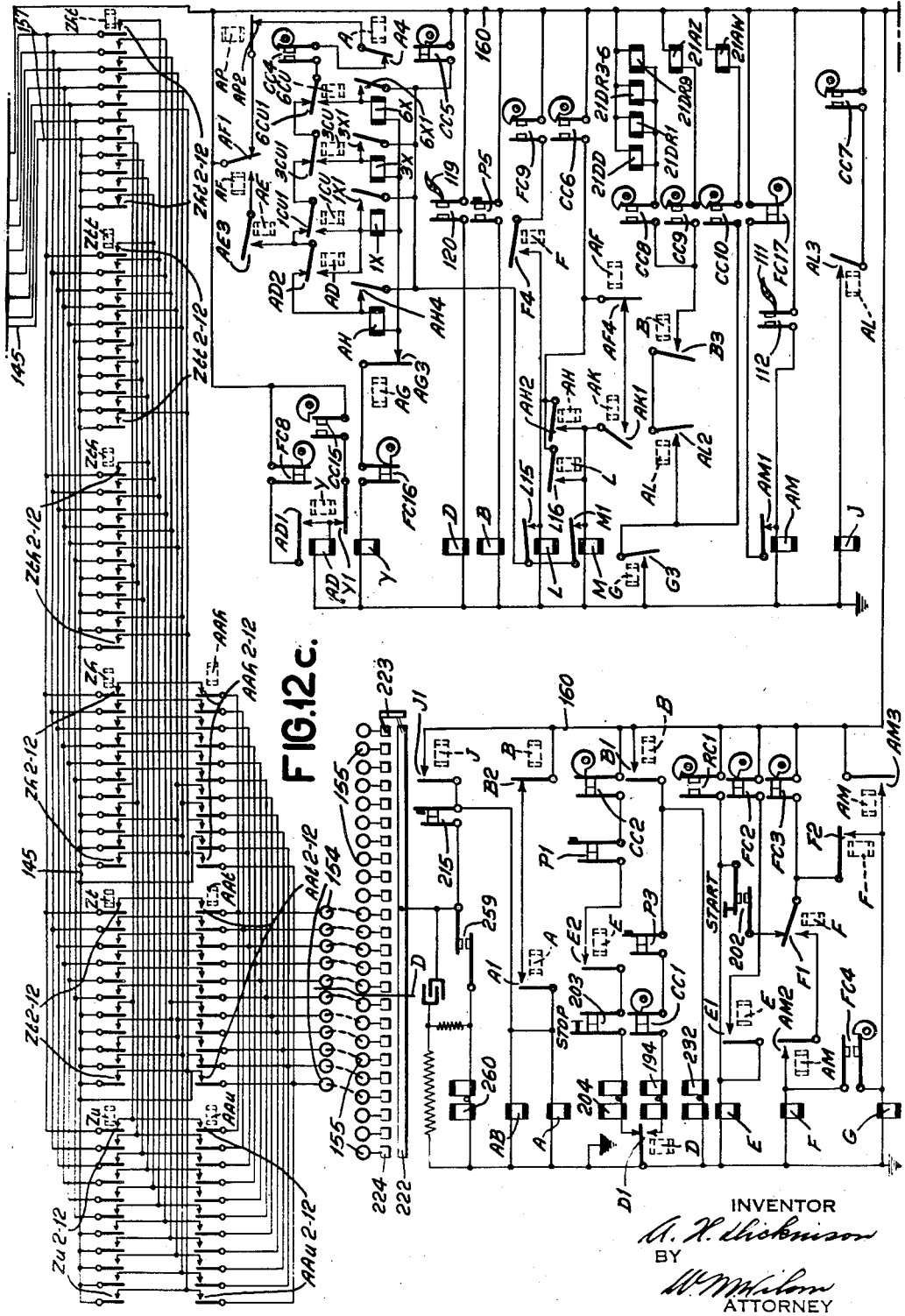

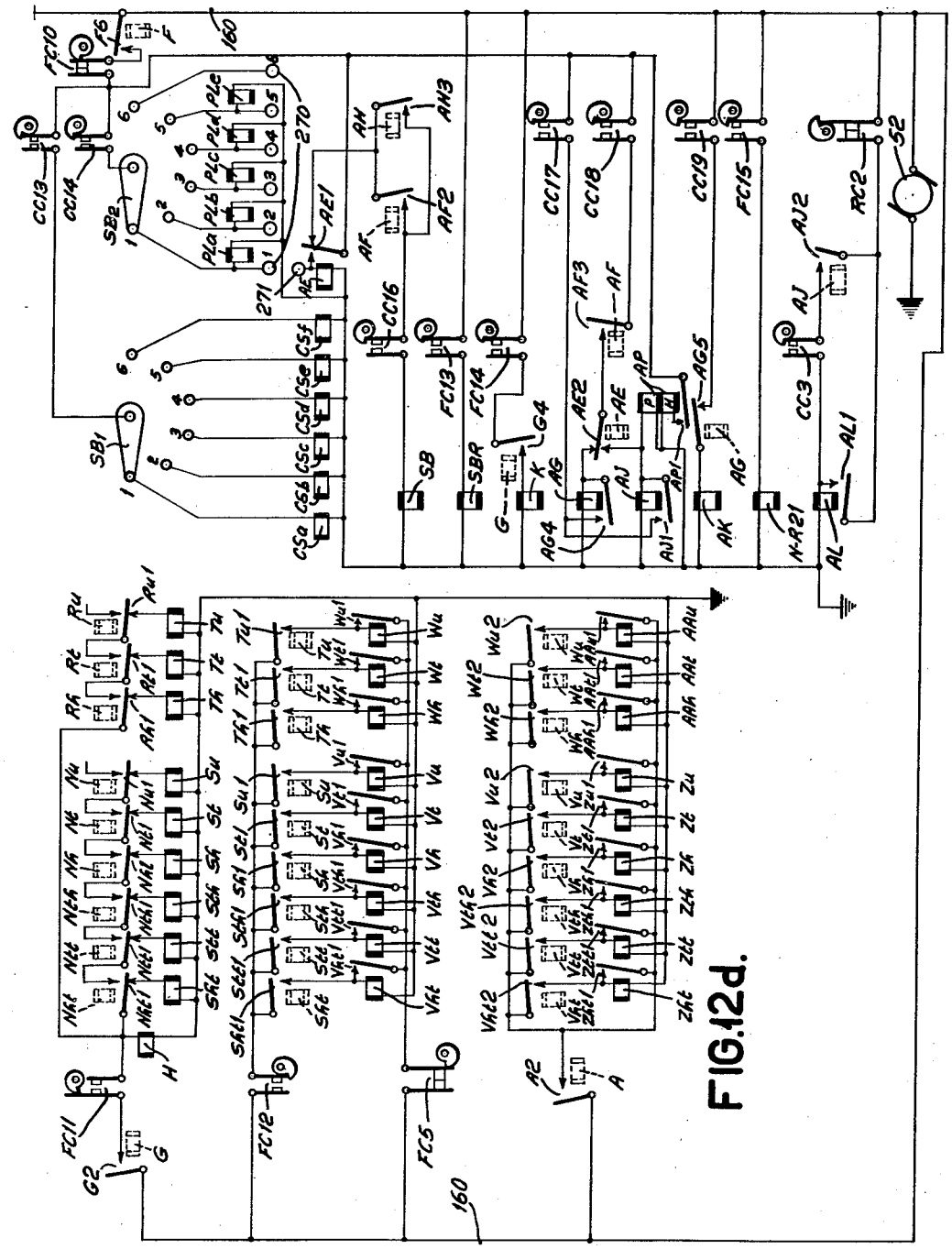

Sept. 7, 1943.            A. H. DICKINSON            2,328,623
                           DIVIDING MACHINE
                       Filed June 4, 1942            15 Sheets-Sheet 13

INVENTOR
A. H. Dickinson
BY
ATTORNEY

Sept. 7, 1943.　　　A. H. DICKINSON　　　2,328,623
DIVIDING MACHINE
Filed June 4, 1942　　　15 Sheets-Sheet 14

FIG.16.

| MACHINE CYCLE | DD 002226 | Q 0742 | | DR 003 |
|---|---|---|---|---|

|  | DD | DR1 | DR3-6 | DR.9 |
|---|---|---|---|---|
| 3 | 00222600 | .300 | 0300 | 3000 |
| 4 | 9' | | 0600 | 9699 |
| 5 COMPARE NO GO, CSb | 90222600 | 0300 | 0900 | 1 ELUSIVE "1" |
| 6 COMPARE 6 DR GO | 90222600 | | 1800 | 2700 |
| | 9" | | | |
| | 99222600 | | | |
| 7 SUBTRACT 6DR | 5819999 | | | |
| TEST FOR OVERDRAFT | 1 ELUSIVE "1" ——— QUOTIENT DIGIT | | | |
| | 05042600 | | | |
| 8 SUBTRACT DR | 969999 | | | |
| TEST FOR OVERDRAFT | 1 ELUSIVE "1" | | | |
| | 06012600 | | | |
| 9 SUBTRACT DR | 969999 | | | |
| OVERDRAFT CSc | 1 ELUSIVE "1" | | | |
| | 06982600 | | | |
| 10 ADD .9DR | 2700 | | | |
| 11 COMPARE 3 DR GO | 07009600 | | | |
| | 07009600 | | | |
| 12 SUBTRACT 3 DR | 290999 | | | |
| TEST FOR OVERDRAFT | 1 ELUSIVE "1" ——— QUOTIENT DIGIT | | | |
| | 07300600 | | | |
| 13 SUBTRACT | 96999 | | | |
| OVERDRAFT CSd | 1 ELUSIVE "1" | | | |
| | 07397600 | | | |
| 14 ADD .9DR | 2700 | | | |
| 15 COMPARE 1DR GO | 07400300 | | | |
| | 07400300 | | | |
| 16 SUBTRACT 1DR | 9699 | | | |
| TEST FOR OVERDRAFT | 1 ELUSIVE "1" | | | |
| | 07410000 | | | |
| 17 SUBTRACT 1DR | 9699 | | | |
| OVERDRAFT | 1 ELUSIVE "1" | | | |
| | 07419700 | | | |
| 18 ADD DR | 300 | | | |
| | 07420000 | | | |
| QUOTIENT — REMAINDER — | | | | |

*RESULT SHIFT AND PUNCH*

| DD | Q | DR |
|---|---|---|
| 002226 | 000742.00000 | 003 |

*DECIMAL POINT POSITION

INVENTOR.
A. H. Dickinson
BY
W. M. Wilson
ATTORNEY.

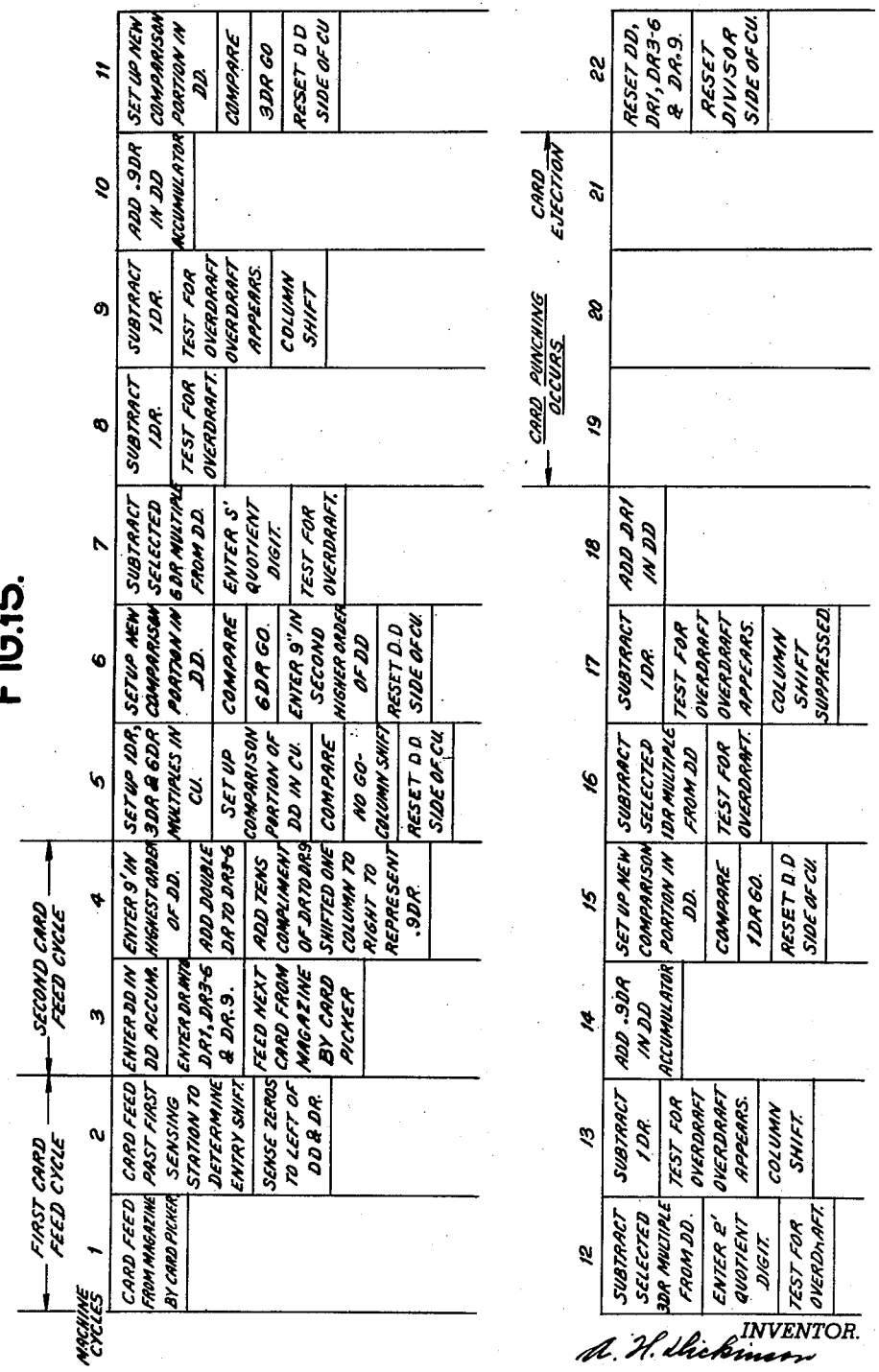

Patented Sept. 7, 1943

2,328,623

UNITED STATES PATENT OFFICE 2,328,623

DIVIDING MACHINE

Arthur H. Dickinson, Scarsdale, N. Y., assignor to International Business Machines Corporation, New York, N. Y., a corporation of New York Application June 4, 1942, Serial No. 445,719

7 Claims. (Cl. 235—61.7)

This invention relates to calculating machines, particularly of the record controlled type which are especially adapted to effect the computing operating of division and, in addition, record the derived quotient on a record card which may be the same control member controlling the computation.

The present machine has for its object the provision of a machine which will effect division in a rapid manner and which machine embodies a construction which secures the benefits and advantages of dividing machines of known arrangements.

In order to more clearly understand how the benefits of previous machines have been made available, it is pointed out that in one known type of dividing machine the method of dividing consists of the successive subtraction method. That is, with the dividend and divisor set up in the machine, a portion of the dividend is taken and the divisor is successively subtracted from this dividend portion until an overdraft condition is detected. The dividend accumulator is then restored to a positive condition by the addition of the divisor amount and the next quotient is then derived by further successive subtraction operations. While an expedient for saving cycles of operation of the machine when an overdraft was detected has been resorted to as illustrated in the patent to J. W. Bryce et al., No. 2,165,220, dated July 11, 1939, nevertheless a dividing machine of this type is time consuming in its operation. Dividing machines of the successive subtraction type are well known and illustrated in many patents, among which is the aforesaid Patent No. 2,165,220.

An arrangement to secure more rapid dividing operations is illustrated in the patent to J. W. Bryce, No. 2,243,473 and in general contemplates the provision of setting up in the machine a representation of all multiples of the divisor and comparing all multiples of the divisor with each comparison portion of the dividend so that immediately upon a comparing operation the related quotient digit can be derived and thereafter the subtraction of the selected divisor multiple can be effected. A considerable saving in cycles of machine operations is derived by a machine embodying this method and by trial and experiment it has been estimated that there is a saving of 70% in time over the successive subtraction method.

However, such form of machine requires a great deal of mechanism and while this form of machine is particularly useful for some installations where extremely rapid dividing operations are a necessity, nevertheless it is not economically justifiable in other installations where less rapid dividing operations are satisfactory.

The object of this invention is, therefore, to provide a dividing machine which utilizes the improved features of the form of dividing machine which utilizes the multiple divisor principle, the resulting machine eliminating much of the mechanisms utilized in known machines of this type but nevertheless securing many advantages over the form of dividing machine utilizing the successive subtraction method.

A further object of the invention consists in the provision of a dividing machine which effects dividing operation by the multiple divisor comparing method but which requires only a few of the divisor multiples to be set up for the comparing operation.

In this connection, it has been found by trial and experiment that different combinations of digital divisor multiples may be provided with resulting benefits over the successive subtraction method and the all-digital divisor multiple method. It has been found for the average calculation that utilization of the 1, 3 and 6 divisor multiple effects a reduction in the number of mechanisms used in the all-multiple divisor method but with an increase in speed of dividing operations over the successive subtraction method to an extent about 30%. By such an arrangement a machine is provided which strikes a favorable medium when lower speeds of dividing operations are acceptable and the cost of manufacture is required to be reduced.

A further object of the invention is to provide a dividing arrangement which sets up the 1, 3 and 6 divisor multiples for comparison with the comparison portion of the dividend amount and thereafter effects the subtraction of the selected divisor multiple, and then successively subtracts the one-divisor multiple until an overdraft condition in the dividend accumulator is derived.

A still further object of the machine is to embody the expedient shown and described in the patent to J. W. Bryce et al., No. 2,165,220 for conditioning the dividend accumulator to a positive condition upon securing an overdraft by the entry of .9DR. This will further enable saving in time of dividing operations without affecting the economical advantages of the present method.

A still further object of the present invention is to provide a novel quotient place limiting mechanism which also has the function of causing the automatic recording of zeros for quotient digits to the right of the selected number.

A still further object of the invention is the provision of means for forming the quotient digits in the higher orders of the dividend accumulator, which accumulator represents in the lower orders thereof the remainder, if any.

Provision is made in the present machine for recording only the quotient result since, in some accounting systems, the remainder is of no material consequence.

The machine further provides by a quotient place limiting device for securing a number of quotient digits which are less than the predetermined available capacity of the machine and when a lesser number of quotient digits are derived, the remainder amount may be represented in some of the higher orders of the dividend accumulator reserved for the quotient digit representations.

In recording operations, provision is made for cutting out the recording of such digits representing the remainder and instead providing for recording of zeros in the related column positions of the card.

A further object of the invention is to arrange for such zero recording by the place limiting device.

It is to be understood that while the principle of the machine embodies the utilization of the setup of the 1, 3 and 6 divisor multiples, nevertheless other divisor multiples may be provided with equal benefits and advantages. For example, a dividing machine utilizing the divisor multiples 1, 2 and 4 may be provided with nearly equal advantages and benefits. It is to be understood, therefore, that while the present disclosure illustrates the preferred divisor multiple combination, obvious variations may be made with equal resulting benefits.

Other objects of the invention will be pointed out in the following description and claims and illustrated in the accompanying drawings, which disclose, by way of example, the principle of the invention and the best mode, which has been contemplated, of applying that principle.

Fig. 1 is a diagrammatic view of the machine drive.

Figs. 2 and 2b are a diagrammatic view of the punching machine.

Fig. 3 is a sectional view showing the trip magnet and latch contact.

Fig. 5 is a sectional view of the electromechanical relay take along line 5—5 of Fig. 6.

Fig. 6 is a plan view of the electromechanical relay.

Fig. 7 is a sectional view of the units order accumulator showing the elusive one entry mechanism therefor.

Fig. 8 is a rear elevational view of one of the so-called comparing units of the machine.

Fig. 9 is a fragmentary detail view of the comparing commutator and brush devices of the comparing unit, the view being taken substantially on lines 9—9 of Fig. 10.

Fig. 11 is another detail sectional view of certain parts of the comparing unit, this section being taken substantially on lines 11—11 of Fig. 8.

Figs. 12a, 12b, 12c, 12d, arranged in this order form the wiring diagram.

Figure 13:
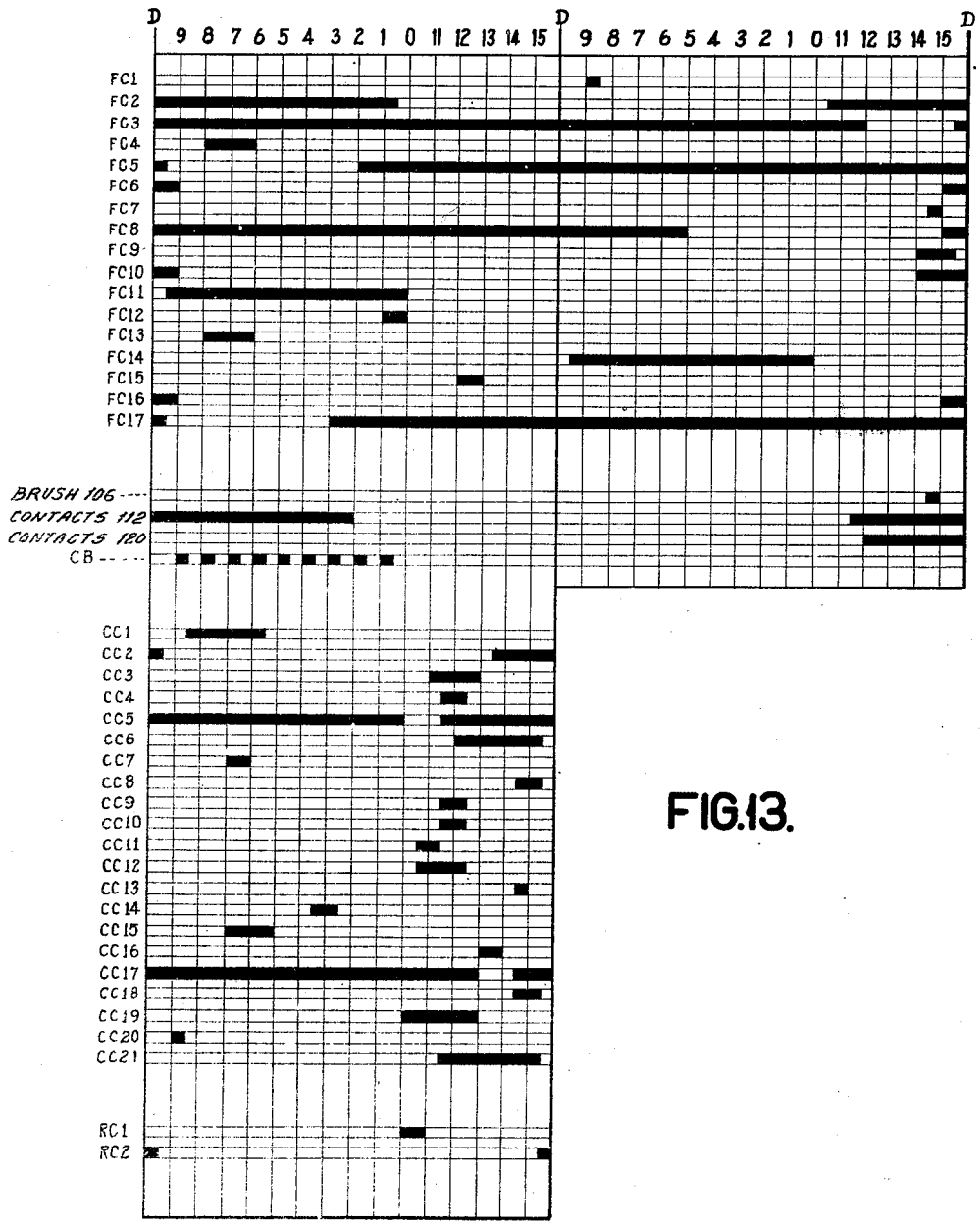

Fig. 13 is the timing chart for the cam actuated contacts used in the machine.

Figure 14:
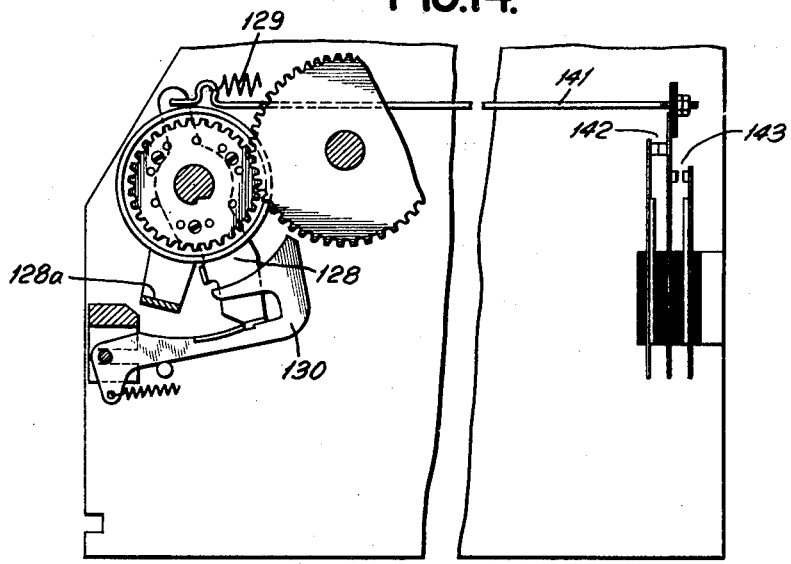

Fig. 14 is a sectional view showing the carry lever actuated contact controlling mechanism.

Fig. 15 is a diagram outlining the sequence of computations.

Fig. 16 is a diagram showing the mathematics of a typical example calculated by the present method.

Machine drive

The machine is adapted to be driven by a constantly running motor M (Fig. 1). The motor, through a pulley drive, drives shaft 51, which in turn drives a generator 52.

Shaft 51, through worm gear drive 53, drives vertical shaft 54 for driving the units of the upper and lower sections of the machine. At its upper end, shaft 54, through worm gears 55, drives the main drive shaft 56. Shaft 56 carries a spur gear 57 driving a gear 58 with a 4 to 1 ratio drive. Gear 58 has extending from it four Geneva pins 59, cooperating with the other or cross element of the geneva designated 60. Secured to driven element 60 is an internal gear 61 meshed with the spur gear 62 mounted on the end of the reset shaft 63. The accumulators of amount receiving devices DR1 and DD are reset from this reset shaft in a known manner by electromagnetically controlled reset clutches. The shaft 56 serves as the driving shaft for the DR1 and DD amount receiving devices, the comparing unit CU, the card feeding and handling mechanism, as well as cam contacts CC1—20. The drive for the lower part of the machine is substantially the same as previously described, i. e., the shaft 54 through worm gearing 55b drives the lower drive shaft 56b. Shaft 56b serves as the driving element for the DR3—6, DR.9 amount receiving devices, the column shift CS unit and the electromechanical relay N—R.

A similar Geneva drive 57b, 58b, 59b, and 60b is adapted to drive an internal gear 61b, which in turn drives a pinion 62b mounted on the end of the lower reset shaft 63b. The lower reset shaft 63b is adapted to reset the DR3—6 and the DR.9 amount receiving devices by means of the usual electromagnet one-revolution clutches.

Card feeding and card handling unit drive

Figure 4:
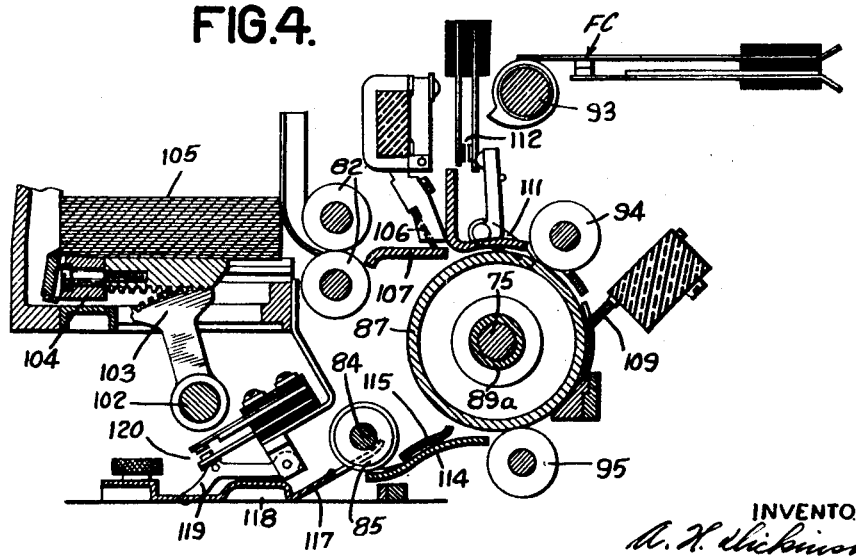
Fig. 4 is a sectional view of the card feeding and handling mechanism.

Referring now to Figs. 1 and 4, the shaft 56 is provided with a gear 68, which, through an idler gear 69, drives a gear 70 which, through its shaft, drives gear 71. Gear 71 in turn drives gear 72, and gear 72 in turn drives a gear 73 revolubly mounted on shaft 75. Gear 73 has fixed to it one element 76 of the one revolution clutch which comprises a pawl 77 carried by an arm 78 which is fixed to shaft 75. The one revolution clutch is of the customary electromagnetic type used in tabulating machines and with this one revolution clutch engaged by the energization of its clutch magnet 204 the shaft 75 will rotate in unison with gear 73 and with the one revolution clutch disengaged, 73 will continue its rotation and shaft 75 will remain stationary.

Gear 73 also drives an intermediate gear 79. Gear 79 in turn drives the gear 80 which in turn, through its associated shaft 84, drives the feed rolls 85. The gear 80 in turn drives the gear train designated 83a which in turn drives the set of feed roll gears 81 which, through the associated shafts, drive the card feed rolls 82. Thus, the card feed rollers 82 and the rolls 85 are continually rotating as long as the main drive shaft 56 is rotated. Secured to the shaft 75 is a gear 88. Gear 88 drives gear 88b which, through tubular sleeve 88c, drives the gear 88d. Gear 88d in turn drives gear 89. Gear 89 through the tubular sleeve 89a is secured to the contact roll 87 and is rotatably mounted on the shaft 75. The purpose of this gearing which is more fully described in the patent to G. F. Daly, No. 2,045,437 is to present to the contact roll 87 a slight creep so that the brush will not always make contact through the hole in the record card at the same point on the contact roll.

Also secured to shaft 75, is a gear 86 which drives two gears 90 and 96. Gear 90 through its associated shaft drives the rollers 94 and gear 96 through its associated shaft drives the rollers 95. Rollers 94 and 95 are made of an insulating material. The gear 90 through an idler gear 91 drives the gear 92. Gear 92 is secured to the shaft 93 on which is mounted the contact actuating cams FC and circuit breaker control cam CB. Shaft 75 also has secured to it a box cam 97 with which a follower 98 cooperates to rock a shaft 102. Secured to shaft 102 is a gear sector 103 which is in engagement with a picker block 104. Upon engagement of the one-revolution clutch the picker is geared into action to withdraw a single card from the magazine 105 (Fig. 4) and advance this card into the bite of rolls 82. These rolls in turn forward the card to the card transfer and contact roll 87. Intermediate of the rolls 82 and the transfer cylinder 87 there is provided an advance sensing brush 106. A plurality of such brushes 106 are provided in this position. The multiplicity of brushes do not show in Fig. 4 since the brushes are in alignment, one being back of the other. The brushes 106 cooperate with the combined contact and card guide plate 107, the function of which will be described later in the circuit description. A curved card guide is provided around the transfer cylinder and the advancing card is carried around by the forward rotation of the transfer cylinder and rolls 94 to traverse the main card sensing brushes designated 109. Also in cooperation with the card is a pivoted card lever 111, adapted to operate the usual card lever contacts 112.

After the card has been sensed by the main sensing brushes 109, it is advanced between guide members 114 and 115 by the cooperation of feed rollers 95 with cylinder 87. While between these members, it is advanced by drag rolls 85 under guide 117 to the punch bed 118 (Figs. 1 and 4). This arrangement provides for the feeding of the card and the advance of the card after it has been released by the rolls 95, so that the card may be delivered into the tray of the punching section of the machine. The drag rolls 85 lead the cards under the guiding member 117 and after this card has been freed from the drag rolls the card is flipped down into the tray of the punching section of the machine. The location of this tray is generally designated 118 in Fig. 4, and the position of the card in this tray is indicated at R (Figs. 1 and 2). A card lever 119 (Figs. 2 and 4) is also provided and adjacent the tray for closing card lever contacts 120 when the card is lodged in the tray of the punching section of the machine.

With the traverse of the card past the advance sensing brushes 106, the number of zeros to the left of the dividend DD and the divisor DR amounts is determined and the corresponding shift circuits are set up so that these amounts will be entered into the proper columnar positions of the respective DD and DR amount receiving devices. With the traverse of the card past the main sensing brushes 109, the amount of the dividend DD and the divisor DR will have been read from the card and entered into the corresponding DD and DR amount receiving device. That is, the divisor amount DR will have been entered into the amount receiving devices DR1, DR3—6, and DR.9. The dividend amount DD will have been entered into the DD amount receiving device. The amount receiving devices or accumulators are fully disclosed in Patent No. 1,976,617 and are of the usual type used in tabulating machines, and are provided with electromagnetically operated clutches.

Both the DD and the DR.9 amount receiving devices are provided with a units position carry lever control magnet DD133 or DR.9133 (Fig. 7) which, as in Patent No. 1,976,617, is used for the purpose of entering an elusive one digit into their respective accumulators of amount receiving devices upon entering a nines complement amount into these units to effect subtraction by the tens complement.

*Elusive one entry mechanism*

Referring now to Fig. 7, the accumulator indicating wheel 126 of the units order shown is rotatably mounted on the shaft 127. Also mounted on shaft 127 is the carry lever arm 128 rocked in a clockwise direction of rotation by the spring 129 and is held from such rotation by the latch arm 130. The arm 128 in this instance is the carry lever associated with the units position of the accumulator. Pivotally mounted on the carry lever 128 is a pawl 132 spring urged against the ratch shaped wheel 134 secured to the indicator wheel 126. Secured to the units position carry lever latch 130 is an armature 131 which is controlled by the magnet 133. Upon energization of the magnet 133 the carry lever latch 130 is moved downwardly releasing the units position carry lever 128 and by the spring 129 the carry lever is caused to rotate in a clockwise direction about the shaft 127 until it abuts the carry lever bail 128a. The amount of rotation of the carry lever 128 is sufficient to move the pawl 132 around on the periphery of the ratchet wheel 134 so that it engages the next notch on this wheel. When the carry lever bail 128a operates, it rocks carry lever 128 and by engagement of pawl 132 with ratchet wheel 134 which is secured to the units position indicator wheel 126, the latter is rotated in a counter-clockwise direction 1/10 of a revolution, thus causing a digit "1" to be entered into the units position.

*Carry lever actuated contact for overdraft detecting mechanism*

Referring to Fig. 14, the carry lever actuated contact consists of a transfer group of contact blades whose center strap is tensioned so that contacts 143 would close and contacts 142 would open if they were not held in the position shown by means of the pull rod 141 coupled to the carry lever 128 which is latched position by means of the carry lever latch 130. Thus, upon releasing a carry lever 128, to effect a carry in its corresponding order, spring 129 rocks carry lever 128 and the associated contacts 142 and 143 are operated to a reverse position of that shown in Fig. 14, i. e. contacts 143 will be closed and contacts 142 will be opened. The contacts 142 and 143 will remain in this transferred position until the carry lever 128 is restored to its latched position by means of the well known carry lever restoring bail 128a. The contacts 142 and 143 are provided in all orders of the DD accumulator except the lowest and the highest order positions to provide for a special condition when the DD accumulator is sensed for the detection of an overdraft.

The punching mechanism

The punching mechanism is of the customary successive column acting repetition punching type generally used as result recording machines in calculating machines of this class. It is generally of the form shown in U. S. patent to Lee & Phillips, No. 1,772,186 and the U. S. Patent No. 1,976,618.

The punching machine is shown diagrammatically in Figs. 2 and 2b mainly for the purpose of showing the relative locations and operations of certain controlling contacts and magnets. Contacts P1 are located in such a position that when the card carriage, right, is in its extreme right hand position (Fig. 2b), the right end of rack 181 causes the contacts P1 to be closed, but if the card carriage is moved to the left from its extreme right hand position, contacts P1 will be opened. The purpose of such contacts is to prevent card feeding operations by the card feeding and handling unit unless the card carriage is in its extreme right hand position. Contacts P3 are controlled by the card eject mechanism and are closed when the eject mechanism is in its fully operated position. The purpose of these contacts is to prevent feeding of the next card to the punching position until the card which is acted upon is in position to be ejected from the punching machine. Contacts P5 are located in such a position that they are controlled by the left hand card rack 182, and are closed when the left hand card rack 182 is in its extreme left column position. The purpose of the P5 contacts is to control the eject mechanism in such a manner that the eject mechanism will not function until the card carriage has arrived at its extreme left hand position. The contacts 120 operated by the card lever 119 have been previously described and are for the purpose of sensing whether a record card is in the R position on the punch bed, and contacts 120 control the trip magnet 194, preventing energization of this magnet until the card is in the R position. These contacts 120 further control the card feeding and handling mechanism, preventing the operation of such card feeding and handling mechanism upon closure of contacts 120 until the card has been fed to the punching position and the card carriage (Fig. 2b) has been returned to its extreme right hand position. The trip magnet 194 serves to cause the punch motor PM to drive the card carriage in the manner disclosed in the aforementioned patents. The trip magnet 194 also serves to close contacts 197 (Fig. 3) by means of the arm 195. When the magnet 194 is energized the arm 195 is rotated in a clockwise direction about its shaft and the downward motion of this arm 195 causes the contacts 197 to close. The contacts 197 are then latched closed by the latch arm 198 until the card has been fed to punching position at which time, through a member in the clutch mechanism the latch arm 198 rocks counterclockwise to release the contacts 197 and allow them to open. The eject magnet 232, (Fig. 2) is for the purpose of controlling the card ejecting mechanism. The diagrammatic showing of the punch in Fig. 2 is primarily for the purpose of showing the location and operation of the various contacts and magnets which are shown in the circuit diagram.

The comparing unit

The comparing unit CU (Fig. 1) will now be more specifically described. The comparing unit (Fig. 8) comprises supporting side plates 295 which are secured together by suitable cross members which also afford support for various parts such as magnets, bails and springs. The comparing unit is provided with a drive gear 296 (see Figs. 1, 8, 10) which is geared to the main drive shaft 56. Such gear 296 is fast to the comparing unit drive shaft 297 (see also Figs. 8, 10, 11). The shaft 297 has secured to it a pair of bail operating cams 298 and a pair of restoring cams 299 and 300. Suitably secured in the side plates is a cross-shaft 301 on which are pivotally mounted in interspersed relation two series of sectors, one of which is designated 302 and the other of which is designated 303 in Fig. 10. It will be understood that there is a pair of such sectors 302 and 303 for each denominational order in which comparison is to be effected. The sectors are adapted for pivotal rocking movement on the supporting shaft 301 and timed rocking movement is imparted to the sectors by bails 304 and 305 which bails are each connected to their respective sectors by springs 306.

Figure 10:
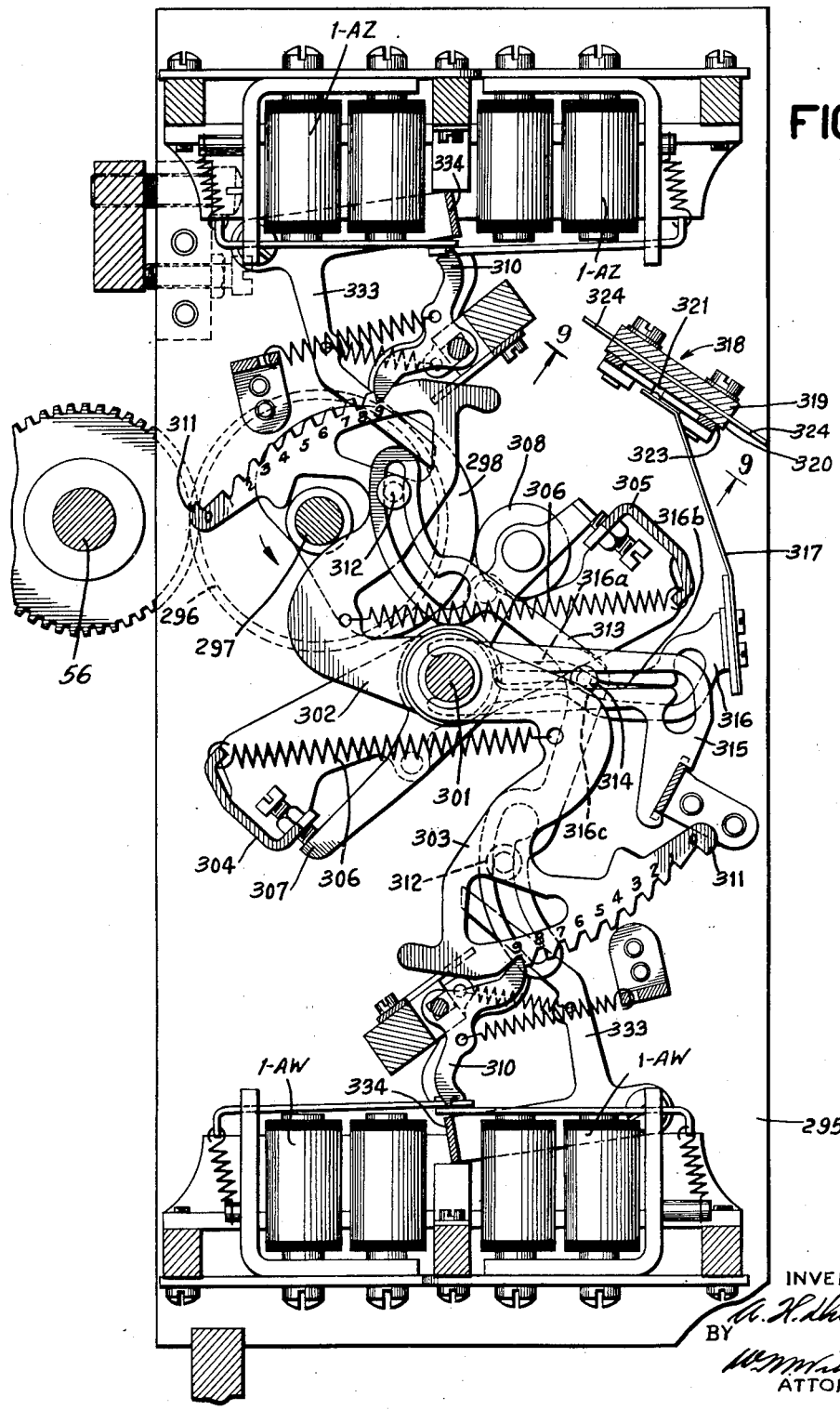
Fig. 10 is a detailed sectional view of the parts for one order of a comparing unit, this section being taken along lines 10—10 of Fig. 8.

Rocking movement is imparted to the bails by bail actuating levers 307 (one of which only is shown in Fig. 10). Each of such levers carries a cam follower roller 308 which cooperates with a cam 298. The cam follower rollers 308 are maintained in cooperation with cams 298 by means of springs 309 which are attached to the bail arms and to a fixed support as shown in Fig. 11. Differential movement of the sectors is determined by magnetically tripped stop pawls 310 (see Fig. 10). Such stop pawls are normally latched by their related magnet armatures out of the path of the ratchet teeth on the sectors. The comparing magnets are generally designated AW and AZ. It will be understood that the AZ magnets control the related upper sets of sectors 302 and the lower comparing magnets AW control the movement of the lower sectors 303. For compactness of construction the magnets are disposed in a somewhat staggered relation, which will be apparent by inspection of Fig. 10. In Fig. 10, the right and left lower comparing magnets 1AW are adapted to control two adjacent sectors, one of which is behind the other.

Upon energization of a comparing magnet such as 1AW at a differential time, its armature will release the stop pawl 310 which will swing under the influence of its spring to engage the sector ratchet and differentially stop it in a position corresponding to the differential time at which an impulse is received to energize the comparing magnet. In Fig. 10 the sector 303 is shown as stopped at the "9" index point position and likewise the sector 302 is also shown stopped at the "9" index point position. In the event that there is no energization of a comparing magnet, the stop pawl 310 will stop its related sector at the "0" index point position due to the high shoulder 311 beyond the zero position.

Each sector 302 and 303 carries a pin 312 and each of these pins extends through slots in a differentially floating link 313. Each differential link has a pin 314 carried thereby and extending therethrough. Each such pin 314 is slidably guided for in and out movement with respect to the shaft 301 by means of a slotted member 315. Also cooperating with each pin 314 is a member 316. Member 316 has a cam slot portion 316a comprising a straight portion, another straight portion 316b and a connecting sloping portion 316c. The relation of parts is such that if sector 303 has the same setting as sector 302, for example at the "9" index point position as shown in Fig. 10, the pin 314 will remain at the center in the sloping cam portion 316c under this condition there will be no movement of the arm 316. On the other hand, when pin 314 is caused to move to the right as is the case when sector 302 moves to a greater extent than sector 303, then member 316 will be rocked upwardly or counterclockwise about 301 as a pivot. This counterclockwise movement of 316 occurs when the amount set in sector 302 is less than the amount set in sector 303. On the other hand, when the amount set in sector 302 is greater than the amount set in sector 303, the pin 314 will move to the left or into the 316a cam slot portion of 316. This will cause clockwise swinging of 316 about 301 as a center.

By the above mechanism for any order of the comparing unit, it is possible to compare two numbers in a given order and to get three selective settings of 316. One setting is made when the members are equal in which case there is no movement imparted to 316, and it remains in the center position. The other conditions are in upward or downward displacement of 316.

It will be understood that in order to provide for comparison of multi-denominational members there are a pair of sectors 302 and 303 for each order and further that there is a member 316 for each order. Each member 316 has secured to it a brush contact bifurcated wiping member 317 (see Fig. 9). In Fig. 9 there are shown five wiping members 317. The three to the extreme left are in non-shifted position or middle position. The second from the right is in upper position indicating that its sector 303 has moved to a less extent than its related sector 302 and the extreme right hand wiping member is in down position, indicating the reverse sector condition.

Suitably mounted upon the side plates in cooperation with the brush members 317 is a comparing commutator generally designated 318. This comparing commutator comprises a base plate 319 and a face strip 320 of insulating material supported by other strips of insulating material 321. Suitable fastening rivets secure the parts together and secured to the face of 320 are common contact strips 322 and 323. Located between the strips 319 and 320 are a series of terminal plates 324 having portions which extend beyond the edges of the commutator for circuit connections. Parts of terminal plates 324, to a certain extent, resemble triangles with their points extending to the right. Note the dotted line extension in Fig. 9. Carried on the face of the strip 320 are a number of contact plates 325, each of which is connected to a related terminal plate 324. The contact strips 322 and 323 are serrated and arranged so that the serrations pass each other and extend into the spaces between the contact plates 325. The ends of the serrations of 322 and 323 and between 325 are blocks of insulating material 321 having contact rivets 326 which connect with the respect terminal blocks 324.

It may be explained that the comparing commutator is sectionalized for making comparison of four orders with four orders. With the setting shown for the brushes to the extreme left in Fig. 9, the circuit will come in at the wire marked "In" to block 324. It will extend through 325, through the brush 317, thence to plate 322 and out on the circuit labeled "DR less than DD." However, assume that the right hand brush is in the middle position. In this event, the circuit would extend from the "In" wire to contact block 325, through brush 317, through the segment 326 of the next order to the left, thence through contact block 325, through the brush 317 of this order, again through 326 and 325 pertaining to the next order, through the brush 317 of this order, through the blocks 326 and 325 and out on the "Out equal" wire. On the other hand assume the right hand 317 brush of the four order unit is in the down position. The circuit comes in on the "In" wire, through the contact block 325, through the brush 317, is then completed through the lower serrated member 323 to an out line labeled "DR greater than DD."

With reference to the comparing commutator, it may be explained that the first brush from the right in any group which has moved off from the central or equal position effects the control. For example, assume that the third brush 317 from the left in Fig. 9 is in middle position and the second brush from the left is in upper position, then in that event the circuit would be completed from the "In" line, through the terminal block 324, through block 325, through the brush 317 in say the hundreds order, through spot 326, through block 325, through brush 317 to contact plate 322 and out. In short, it may be stated that it is the highest order shifted brush which is controlling for purposes of comparison.

In the use of the comparing units it is desirable to set up one side of the comparing unit once and then hold the setting and it is also desirable that the other side of the comparing unit be set up, then restored and set up again for a following comparing cycle. In order to provide for this operation, certain bail movement controlling mechanisms are provided, which will now be described.

Referring to Fig. 11, it will be noted that the bail 305 is provided with a spring pawl 327 and that bail 304 is provided with a spring pawl 328. Arranged to cooperate with 327 and 328 are pawls 329 and 330 which pawls may be considered as normally having the latched position as shown. Upon clockwise swinging of bails 304 and 305 the pawls 327 and 328 first yield and ride upon the face of pawls 329 and 330. When the end of the bail movement is reached, the pawls 327 and 328 snap into the position shown, and thereafter both bails 304 and 305 will be latched against return movement. If it is desired therefore to retain the setting of an upper sector 302 (Fig. 10) magnet 21AZ (Fig. 11) is not energized. So long as this magnet is deenergized, the previous setting of sector 302 or a plurality of such sectors will be retained.

Referring now to the lower sector 303, it is desired that this sector be reset on each comparing cycle. Accordingly, magnet 21AW (Fig. 11) is energized. Upon the attraction of its armature, pawl 130 will swing under the influence of its spring in an anticlockwise direction out of intercepting relation with pawl 328. Accordingly, bail 304 can have an anticlockwise restoring movement to restore the sector or sectors 303 cooperating therewith.

Arms 332 (Fig. 11) are oscillated by cams 299 and 300 once each machine cycle and such arms are provided for the purpose of knocking off the armatures of magnets 21AZ and 21AW whenever any armature has been tripped and such frame is also adapted to restore the pawls 330 and 329 to their latched position. When the bails 304 and 305 are swung counterclockwise to restore the sectors, the pawls 310 (Fig. 10) ride up on the smooth high parts of the sectors beyond the nine ratchet tooth position and thus displace the pawls out of the line of the ratchet teeth. At about this time the leading edge of a bail such as 304 engages a pivoted armature restoring member 333 and rocks it clockwise to displace the bail 334 and therefore knock off the armatures and relatch the stop pawls 310.

Electromechanical relay

Referring to Fig. 1, there is shown an electromechanical relay unit generally designated N—R which is of a construction similar to that shown in Patent No. 2,161,614. This unit has a drive shaft 135. The drive shaft is adapted to turn one-quarter of a revolution for each revolution of the main drive shaft 56b, when the one revolution clutch 21N—R is engaged.

Referring now to Figs. 5 and 6, the shaft 135 is suitably journaled as shown and intermediate the journals the shaft is provided with a square cross section, as clearly shown in Fig. 5. In general, the contact operation of this unit is as follows: Each set of contacts has a tripping magnet associated therewith, and such tripping magnets are designated N and R. Upon energization of either of these magnets, their associated contacts will be transferred in reverse position from that shown. Such contacts thereafter remain in shifted position until the shaft 135 makes one-quarter of a revolution, whereupon the cam contacts are mechanically restored to their initial position and are then latched in this position. The rotation of the shaft 135 restores the contacts to their initial position.

Referring to Fig. 5, N is one of the tripping magnets. Cooperating therewith is a spring retracted armature 136 which has its upper portion in contact with a latched piece riveted to an insulating strip 137. A suitable spring such as 138 presses the insulating strip 137 downwardly. The insulating strip 137 extends along and overlies the square shaft 135. It will be self-evident that upon energization of the magnet N related contacts will shift to reverse position and remain in such position. Thereafter, upon one-quarter revolution of shaft 135, one square corner of the shaft will first abut the insulating strip 137 and lift it to upper position restoring the contacts, and slightly later another corner of the square shaft intercepts a camming element 139 integral with the armature 136 and positively shifts the armature away from the magnet into latching position.

The construction is substantially duplicated for the right hand section of the unit. The center plate of the transfer contacts has fastened to it an insulating member 140 which cooperates with the insulating strip 137 to cause the contacts to be operated in the manner just described.

General description

It might be advisable, before describing the operation of the machine in connection with the circuit diagram, to briefly outline the sequence of operation.

During the first card feeding operation which consumes two machine cycles, the DR and DD amounts are analyzed to determine the number of zeros to the left of the highest order significant digit in order to determine the denominational magnitude of such amounts. The purpose of this analysis is to shift the entry of the dividend and divisor into the proper denominational positions of the dividend and divisor amount receiving devices. This analysis is made at the end of the second machine cycle of the first card feed cycle, as is outlined in Fig. 15, and during the first card feeding cycle the bottom card is fed from the card supply magazine past the advance sensing brushes 106 (Fig. 4) and just up to the card analyzing brushes 109. During the second ensuing card feed cycle the same card is fed past the analyzing brushes 109 and the dividend and divisor amounts are entered into their respective amount receiving devices in proper denominational orders. This entry is also outlined in Fig. 15 and is made during the first machine cycle of the second card feeding cycle. During the second machine cycle of the second card feeding cycle the 1, 3, and 6 multiples of the divisor amount are built up and formed and also during the first machine cycle of the second card feeding cycle the next card is fed from the bottom of the magazine to the analyzing brushes 106. During the analyzing operation for the next card the zeros to the left of the highest order significant digits of the divisor and dividend amounts on the next card are sensed. During the first machine cycle following the second card feeding cycle, a comparison is made between the 1, 3, and 6 multiples of the divisor and a comparison portion of the dividend amount derived from the first card and now in the DD accumulator. The nearest going multiple is then selected and from the related divisor multiple receiving device the nearest going multiple amount is subtracted from the comparison portion of the dividend amount. Thereafter, the "1" multiple of the divisor amount is then subtracted one or more times during successive machine cycles and each time the divisor amount is subtracted, the comparison portion of the dividend accumulator is sensed until an overdraft condition in the DD accumulator is indicated, thus indicating that the required number of "1" multiple subtraction operations has occurred for that comparison portion of the dividend amount. Upon sensing this overdraft condition, which is indicated when a certain order of the dividend accumulator represents "9", a column shift is effected and the .9DR amount is additively entered in the DD accumulator, bringing the latter to a positive condition. A new comparison is then made between the 1, 3, and 6 multiples of the divisor amount and the new comparison portion of the dividend amount. The nearest going multiple of the divisor amount is then subtracted from the new comparison portion of the dividend after which the "1" multiple of the divisor is again subtracted during successive machine cycles a suitable number of times until the dividend accumulator represents a negative or overdraft condition. This sequence in operation is continued until quotient digits have been obtained to a preselected number of places. After the required number of dividing operations has been performed and the quotient has been entered in the higher orders of the dividend accumulator reserved for such entry, an automatic quotient recording operation ensues. Preferably, this consists of punching back on the card controlling the dividing operation the quotient digits, and the particular columnar positions of the card in which the punching takes place is preferably controlled through a column shifting device which is also controlled from the setup made when the card to be punched was analyzed at the advance sensing station.

*Operation of the machine in connection with circuit diagram*

Figure 12B:
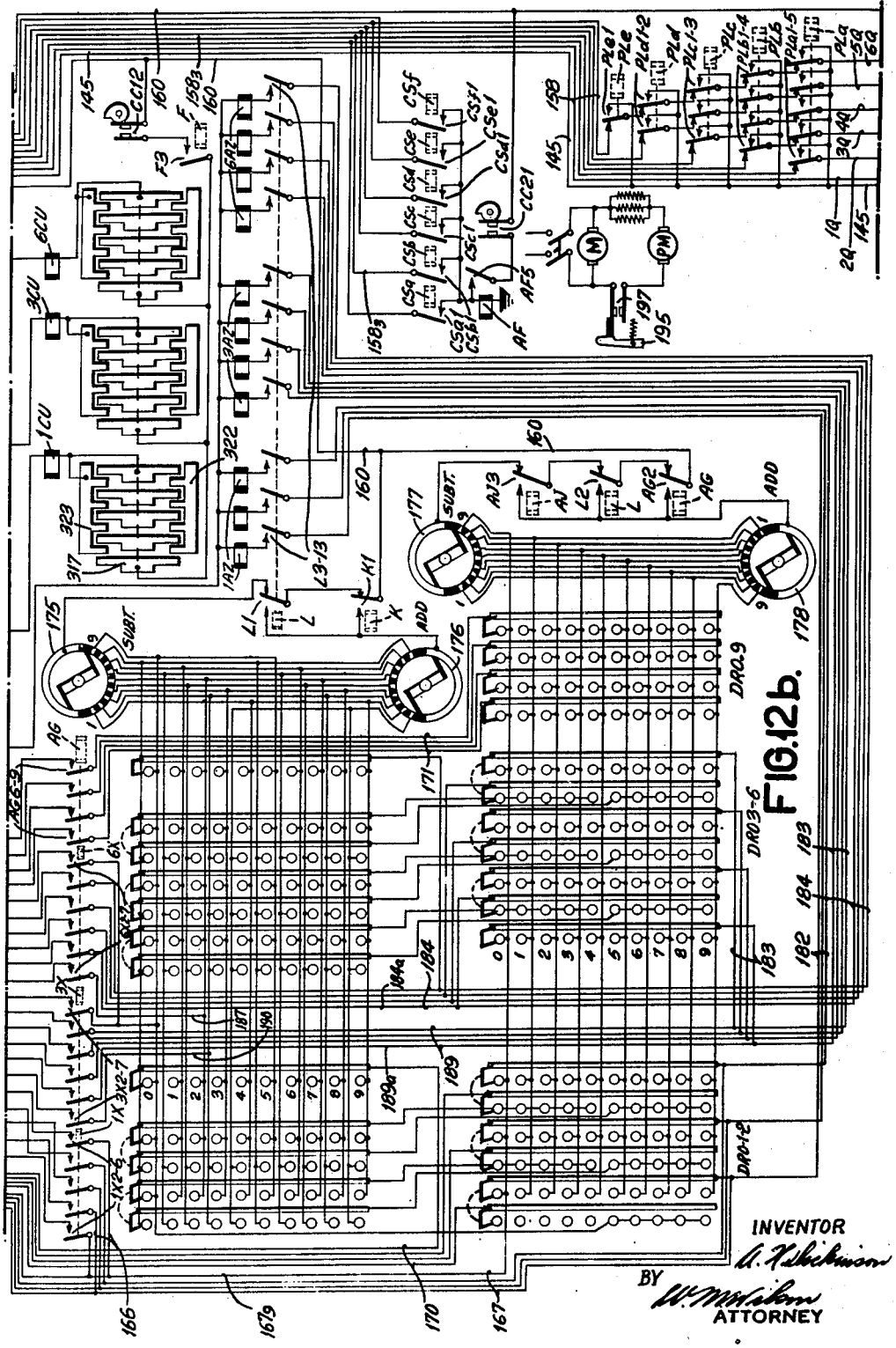

Assuming that a supply of cards has been placed in the magazine 105 (Fig. 4), upon closing the main line switch the drive motor M (Fig. 12b) is set in continuous operation and in turn drives the generator 52 (Fig. 12d) which supplies power to the line 160 and ground. Assuming now that the card rack 182 (Fig. 2) of the punching machine is in extreme left hand position and the card rack 181 of the punching machine has been restored to its normal extreme right hand position, respective contacts P5 and P1 will be closed. With contacts P5 closed, a circuit will be completed from the line 160 through contacts P5 (Fig. 12c), thence through relay coil B to ground. The energization of the B relay causes the related relay contacts B1 and B3 to close and relay contacts B2 to open, all of which are shown in Fig. 12c. The closure of relay contacts B1 completes a circuit from the line 160 through relay contacts B1, through the card eject control magnet 232 to ground.

As is well known in the form of punching machine previously described, the energization of the card eject control magnet 232 will eject a card if it happens to be in the punching machine and when the card has been fully ejected, contacts P3 are closed.

Now, if the machine is set into operation by depressing the start key, the start key contacts 202 (Fig. 12c) will be closed to complete a circuit from the line 160, through cam contacts FC3 now closed and at rest, thence through relay contacts F1 now in the position shown, thence through the start key contacts 202, through relay coil E to ground. The energization of the relay coil E closes its stick contacts E1, thereby setting up a holding circuit for the relay coil E which extends back through the E1 relay contacts and cam contacts FC2 to line 160. The closure of the relay contacts E2 (Fig. 12c) completes a circuit when cam contacts CC2 close which is described as follows: from the line 160, through cam contacts CC2, through P1 contacts now closed, through the relay contacts E2 now closed, through the stop key contacts 203 normally closed, through the card feed clutch control magnet 204, through the relay contacts D1 now in the position shown, to ground; thus energizing the card feed clutch control magnet 204 and initiating card feed operations. The engagement of the card feed clutch now causes a card feed cycle to ensue and near the end of the second machine cycle of the first card feed cycle, card lever contacts 112 are closed and complete a circuit from the line 160, through contacts 112 now closed, through the relay coil AM to ground. The energization of the AM relay coil causes its contacts AM1 (Fig. 12c) to close, thus completing a holding circuit back to the line 160, through relay contacts AM1 and cam contacts FC17. Cam contacts FC17 and the card lever contacts 112 are so timed that they overlap so that as long as cards are continuously fed the relay coil AM will be maintained energized until the beginning of the card feed cycle following the feeding of the last card past the analyzing brushes 109.

The closure of relay contacts AM3 completes a circuit from the line 160 through the relay contacts AM3 (Fig. 12c) to relay coil G to ground. Hence, the energization of the relay coil G is maintained as long as relay coil AM is energized because its contacts AM3 provide the energizing circuit for the relay coil G.

Referring now to Fig. 12a, it will be observed that the energization of the relay coil G closes its relay contacts G1, thereby extending the current supply line 160 through G1 contacts, through cam contacts FC7 to the common contact plate 107 of the advance analyzing station. Cam contacts FC7 are timed to close as shown in Fig. 13 at the time the "0" index point positions are under the analyzing brushes and by analyzing the zero perforations shift control relays will be energized in a manner to be subsequently explained so that the dividend and divisor amounts are shifted for entry in the proper denominational orders of the respective amount receiving devices.

At the termination of the second machine cycle of the first card feed cycle, the machine will stop, requiring the operator to again depress the start key to close the start contacts 202, resulting in the energization of the relay coil E in the manner previously described. Again, in the manner previously described, the closure of E2 relay contacts will result in the transmission of an impulse to the card feed clutch control magnet 204 so that a second card feed cycle will be automatically initiated. This card feed cycle comprises two machine cycles 3 and 4 (Fig. 15) and the events which occur during such machine cycles will now be described.

During the beginning of the third machine cycle, cam contacts FC4 (Fig. 12c) close, thereby completing a circuit from the line 160 through relay contacts AM3 now closed, thence through cam contacts FC4, through relay coil F to ground. Relay contacts F1 now transfer, thus disconnecting the energizing circuit for relay coil E from the start key contacts 202, and since relay contacts F2 will now close, it will be seen that a holding circuit for the relay coil F back to the line 160 is provided by relay contacts AM2 now closed, relay contacts F1 now transferred, relay contacts F2 now closed and relay contacts AM3 now closed, to line 160. By the above holding circuit the relay coil F will be maintained energized during the successive machine cycles of operation.

During the first machine cycle of the second card feed cycle, and each subsequent machine cycle when cam contacts CC10 close, a circuit is completed from the line 160, through reset coils 21AW of the comparing unit, thence through cam contacts CC10, through relay contacts G3 now closed to the ground. It will be recalled from the previous description that the energization of the 21AW reset coils will clear out the representations on the dividend side of the comparing unit.

During the first machine cycle of the second card feed cycle, the first card fed from the magazine is fed past the analyzing brushes 109 and the dividend and divisor amount representing perforations are sensed so as to cause the entry of such amounts in their respective amount receiving devices by circuit connections to be subsequently explained. Card feeding continues until the leading edge of the card engages card lever 119 (Fig. 4) to close contacts 120, such contacts being closed at the end of the second machine cycle of the second card feed cycle.

When card lever contacts 120 close, relay coil D will be energized by an obvious circuit shown in Fig. 12c. Relay contacts D1 (Fig. 12c) now transfer so as to complete a circuit when cam contacts CC1 close; described as follows: From the line 160, through relay contacts B1 now closed, thence through punch contacts P3, thence through cam contacts CC1, through the trip magnet 194, thence through lower contacts of D1 relay contacts to ground. It will be recalled, noting particularly Fig. 3, that the energization of the trip magnet 194 will cause the closure of contacts 197 (see Fig. 12b), completing a circuit to the motor PM of the punching machine, thus moving the card carriage to cause the card to be fed to the punching position. As the card which has been fed to the punching machine moves away from the card lever 119, (Fig. 2) contacts 120 will open, thereby releasing the D relay coil. Relay contacts D1 now transfer to normal and at the same time the punch control contacts P1 open and remain open until the card rack 181 has been restored to its extreme right hand position, thus preventing subsequent card feeding operations until the rack 181 has been returned to its normal position shown in Fig. 2.

*Dividend and divisor entry*

There will now be described the setup of the entry shift control relays which are set up in accordance with the number of zeros at the left of the highest order significant digit. It will be recalled that the electrical circuit for this function is from the line 160 through relay contacts G1, (Fig. 12a) thence through cam contacts FC7 to connect the current supply to the common conducting strip 107, thence through the zero perforations to the analyzing brushes 106 (Fig. 12a). It will be assumed that the divisor amount consists of three digit representing columns and the dividend amount field consists of six digit representing columns. For each column of the DR amount representing field there is provided a respective R relay shown in Fig. 12a and for each column of the DD amount representing field there is provided an N relay. For the selective energization of the R relays it will be seen that there are plug connections from the plug hubs of the analyzing brushes for the DR representing field to the plug hubs 150 connected to the R relays. Similar plug connections are made between the plug hubs of the analyzing brushes 106 for the DD amount representing field and plug hubs 151 connected to the N relays.

It will be assumed that for the purpose of explaining the operation of the machine the dividend amount represented on the card is —002226— and the divisor amount is —003—. (See Fig. 16.) Therefore, there are two zeros in the dividend amount to the left of the highest order significant digit and also two zeros in the divisor amount at the left of the significant digit of the amount selected. Accordingly, then a circuit will be completed through the relay coils $Rh$ and $Rt$ and also through the relay coils $Nht$ and $Ntt$. The N—R relays are of the type shown in Fig. 5 and fully described hereinbefore and it will be recalled that when their relay contacts are tripped they will remain in tripped position until restored by mechanical means. Thus, the related contacts $Nht$ and $Ntt$ (Fig. 12d) will be transferred and also for the R relays, relay contacts $Rh1$ and $Rt1$ will be tripped. These contacts will obviously remain closed during DR and DD entry operations.

With the above mentioned contacts now in closed position at the beginning of the first machine cycle of the second card feed cycle, cam contacts FC11 will close and upon their closure a circuit will be completed from line 160 through relay contacts G2 now closed, (Fig. 12d) thence through cam contacts FC11, thence serially through $Nhtl$ contacts, $Nttl$ contacts, both of which are now transferred, thence through $Nth1$ contacts now in the normal position to $Sth$ relay coil to ground. Also a circuit will be closed from cam contacts FC11 through the now transferred relay contacts $Rh1$, thence through the now transferred relay contacts $Rt1$, thence through relay contacts $Ru1$ now in the position shown through relay coil $Tu$ to ground. Also from the cam contacts FC11 an impulse is directed through the relay coil H to ground (Fig. 12d). The energization of the relay coil $Tu$ in the selected example will close its relay contacts $Tu2$ (Fig. 12a). The relay coil $Sth$ in the selected example will close its contacts $Sth2$—5 also shown in Fig. 12a. The energization of the relay coil H will close contacts H1—6 (Fig. 12a). The above mentioned contacts remain closed during the time that the divisor amount and dividend amount are entered in the respective entry receiving devices which entry is effected during the first machine cycle of the second card feed cycle by circuits now to be described in detail. The relay contacts $Tu2$ function to shift the DR entry whereas the closure of contacts $Sth2$—5 function to shift the entry of the dividend amount in the proper denominational positions of the dividend accumulator.

*Entry of DD and DR amounts*

From the diagram shown in Fig. 15, it will be observed that the entry of the dividend and divisor amounts from the card is effected in the first machine cycle of the second card feed cycle and the circuit connections for effecting such entry will now be described in detail.

The divisor amount is entered in three divisor receiving devices; DR1, DR3—6 and DR.9 and the entry is shifted under control of the contacts $Tu2$ in the selected example. The dividend amount is entered in a dividend accumulator and is also entered as far to the left as possible in a selective manner under control of the contacts $Sth2$—5 in the selected example but in such a manner as to leave two orders to the left of the entered dividend. (See Fig. 16, for entry of —00222600—.)

The divisor amount in the selected example is 300 so that when the sensing brushes 109 allocated for the divisor representing field senses the "3" perforation a circuit will be completed as follows: from line 160, to G1 contacts now closed, through the circuit breaker contacts CB, thence to the contact roll 87, the units column brush 109, through the perforation at the "3" position in the units card column, to the plug hub connected to the related analyzing brush. Plug connections are made from the plug hubs connected to the brushes 109 of the divisor representing field to the plug hubs 152 so that the impulse is directed by the plug connection for the units column to the plug hub 152, thence through the relay contact $Tu2$, to the selected entry control magnets 277 for the divisor receiving devices DR1, DR3—6 and DR.9. By following the circuit connections it will be seen that the "3" entry will be made in the DR1 and DR.9 amount receiving devices at the extreme highest order whereas for the DR3—6 receiving device the "3" is entered in the hundreds order for the purpose of reserving the thousands order for the buildup of the 3 and 6 divisor multiples. The entry control magnets 277 correspond to the accumulator control magnets designated by reference numeral 77 in the patent to C. D. Lake et al., 1,976,617 and the entry operation is the same as fully described in this patent.

The dividend amount is entered under control of the six columns reserved for analyzing the dividend amount by the brushes 109. It will be noted that plug connections are made from the plug hubs connected to such brushes 109 to the plug hubs 153. The dividend amount sensed on the card is transmitted to such plug connections to the plug hubs 153 and thence through contacts Sth2—5 now closed to the DD277 accumulator control magnets. By following the circuit connections it will be seen that the highest significant digit "2" of the selected DD amount —2226— is entered in the sixth order from the right, thus reserving the two higher orders for subsequent quotient digit entries and for overdraft detection.

Summarizing, the DD and DR amounts are entered during the first machine cycle of the second card feed cycle, the entry being shifted in a selective manner.

Since the tripped contacts controlled by the N and R relays are restored during the end of this entry machine cycle, it is desirable that a selective setting in accordance with the denominational magnitude of the DR and DD amounts be retained for subsequent quotient recording operations. It will be recalled that the restoration of the tripped relay N—R contacts is effected by the energization of the 21N—R reset magnet shown in Fig. 1. At the end of the first machine cycle of the second card feed cycle, cam contacts FC15 close, thereby energizing the 21N—R clutch reset magnet by an obvious circuit shown in Fig. 12d. However, before the N—R tripped relay contacts are mechanically restored, a selective setting is made by energizing selected V and W relays shown in Fig. 12d.

In the selected example the energization of the Sth relay will close its Sth1 contacts and the energization of the Tu relay will close its Tu1 contacts. When cam contacts FC12 close, a circuit is completed from the line 160 through Sth1 contacts to Vth relay to ground. Also an impulse is directed to the Tu1 relay contacts to the Wu relay to the ground. The closure of the holding contacts Vth1 and Wu1 completes a holding circuit back to the line 160 through such contacts and cam contacts FC5. Therefore, in the selected example the Vth and Wu relays are held energized during dividing operations so that when quotient result recording operations are initiated they may be utilized as a control to effect the selective energization of the Zth and AAu relays which latter control the shifting of quotient recording so that the quotient will be recorded in the proper columnar positions of the card.

Readouts

The various DR accumulators of the machine are provided with readout devices which, in detail of construction, are of a type well known and are arranged with single and multiple sections in a manner to be hereinafter explained in more detail in connection with the wiring diagram. Briefly, it may be stated, however, that the DR section of the machine comprises the three receiving devices previously referred to and known as DR1, DR3—6 and DR.9. Only the DR.9 accumulator is provided with a straight readout known as DRO.9 shown in Fig. 12b. The DR1 accumulator readout DRO1—2 is provided with a straight readout and also with a so-called doubling readout. The DR3—6 accumulator readout DRO3—6 is provided with a straight readout section and also with a doubling readout section, all of which are also shown in Fig. 12b. The construction and operation of the doubling readout is fully shown and described in the patent to J. W. Bryce No. 2,166,928.

Building up of 3 and 6 multiples of the divisor amount

After the divisor amount has been read from the card and set up on the DRO1—2 readouts and the DRO.9 readout there is a building up of the 3 and 6 divisor multiples and from Fig. 15 it will be observed that this is effected during the second machine cycle of the second card feed cycle. Referring to Fig. 12d, it will be noted that upon the closure of cam contacts FC14 during the second machine cycle of the card feed cycle a circuit is completed from the line 160 through cam contacts FC14, through G4 relay contacts now closed through relay coil K to ground, thus, energizing relay coil K. Relay coil K closes its contacts K1 (Fig. 12b) thereby connecting the line 160 to the add emitter 176. During the operation of the emitter 176, impulses are transmitted to the DRO1—2 readout so that digit representing impulses of double the amount standing on the readout are transmitted to a series of impulse transmitting lines 170 which are shown in Figs. 12b and 12a. The relay coil K also closes its contacts K2—10 so that the impulses are directed through some of these contacts to a series of impulse wires 169 connected to the 277 magnets of the DR3—6 accumulator. Since this accumulator represents 0300, double this amount will now be added thereto or 0600 so that the DR3—6 accumulator now represents 0900 or three times the divisor amount. Therefore, the doubling readout DRO3—6 shown in Fig. 12b will be set to represent respectively three times the divisor amount and also six times the divisor amount, which amounts will be available during the subsequent dividing operations.

Formation of .9DR amount

In order to decrease the number of dividing computing cycles, it is preferable to add to the dividend accumulator an amount which is 9/10 of the divisor amount each time that the dividend accumulator goes back of zero or represents an overdraft condition. This feature is fully shown and described in the patent to J. W. Bryce et al., No. 2,165,220, dated July 11, 1939, and for the purpose of saving a cycle for each overdraft condition of the accumulator the arrangement is also included in the presently described dividing machine. The .9DR amount is formed in the DR.9 accumulator by circuit connections now to be described in detail and from Fig. 15 it will be observed that formation of 9/10 of the divisor amount is also effected during the second machine cycle of the second card feed cycle.

It will be recalled that there was previously an entry of the DR amount in the DR.9 accumulator and that this accumulator now represents —3000—. To this amount there is entered the 9's complement of the DR amount but with the entry shifted one order to the right. During the operation of the machine in the cycle just mentioned the subtract emitter 177 operates so as to transmit impulses to the lower readout section of DRO1—2 shown in Fig. 12b, thereby transmitting impulses which are the 9's complement of the amount standing on this readout to a series of impulse transmitting wires 167 which lead, as shown in Fig. 12a, through contacts K6—9 thence through impulse wires 166 to the 277DR.9 accumulator magnets but it will be noted that from the wiring adopted the complement amount is shifted over one column to the right. Hence, with the amount previously standing on the accumulator the following entry is performed.

—3000—
—9699—

—2699—

To this amount the elusive 1 is entered by the following described circuit. It will be noted that the 9 impulse directed through the contacts K9, shown in Fig. 12a, also passes through contacts K10 to the magnet DR. 9133 which is also shown in Fig. 7. It will be recalled that the energization of this magnet releases the carry mechanism for the units order so that at the carry time 1 will be added the units order. Thus, after this entry there will now be represented in the DR.9 accumulator —2700— which is $\frac{1}{10}$ of the divisor amount.

Concurrently with the formation of the $\frac{1}{10}$ divisor amount and the entry of double the divisor amount in the DR3—6 receiving device, a 9 is entered in the column of the dividend accumulator in the highest order thereof which is at the extreme left as viewed in Fig. 12a. This is provided for by a circuit traced as follows: from the line 160 through G1 contacts now closed, through cam contacts FC1 to the last entry control magnet of the group 277DD to ground. Cam contacts FC1 are timed as shown in Fig. 13 to send an impulse at the 9 index point time, thereby entering 9 in the highest order. This 9 entry is shown as 9' in Fig. 16, for machine cycle 4.

*Setting up of comparison portions of dividend amount in comparing unit*

The manner in which a comparison portion of the dividend is set up on the comparing units will now be described.

Referring to Fig. 13, it will be observed that at the end of the second machine cycle of the second card feed cycle, cam contacts FC9 close, thereby closing a circuit from the line 160 through cam contacts FC9, (Fig. 12c) through relay contacts F4 now closed, thence through relay coil L to ground. Contacts L15 close to provide a stick circuit back to the line 160 through relay contacts L15 and cam contacts CC5. Before the relay coil L is energized to close its contacts L16, cam contacts CC6 close, thereby completing a circuit when relay contacts L16 close from the line 160 through cam contacts CC6, thence through relay contacts L16 to grounded relay coil M. The latter closes its stick contacts M1, the stick circuit being maintained by the aforementioned cam contacts CC5. While relay coils L and M are initially energized at the last part of the second card feed cycle, their energization is maintained during the greater portion of the next machine cycle, during which machine cycle the dividend and divisor amounts are set up in the comparing units.

It will be understood that the comparison portion of the dividend includes a selected number of columns. The number of columns initially selected is determined by the CSa relay and its relay contacts CSa2—9 (Fig. 12a). Referring to Fig. 12a, a circuit is completed from the line 160 through relay contacts A3 now closed, thence through relay contacts M2 to connect add emitter 174 to the line 160. With such emitter in circuit, impulses are transmitted through DDRO, thence through now transferred relay contacts M3—10, by a set of lines 164 through the now shifted relay contacts CSa2—9, thence through relay contacts ML11—16 now transferred to the three groups of dividend side comparing magnets generally designated 1AW, 3AW and 6AW.

It will be understood that the comparison portion of the dividend is set up in multiple in the comparing units, that is to say, there are three identical setups of the comparison portion of the dividend in order that there can be comparing between each of the three different divisor multiples. In the typical problem under consideration, the comparison portion of the dividend which was so set up is the amount of —0222. The setup of the muliples of the divisor on the other side of the comparing unit sections will now be described but before this description is given it will be explained how the CSa2—9 relay contacts are closed.

At the end of the card feed cycle, cam contacts FC10 (Fig. 12d) close and while such cam contacts are closed cam contacts CC13 close, thereby completing a circuit from the line 160 through relay contacts F6 now closed, cam contacts FC10, CC13, thence through the stepping switch arm SB1 which is now in the 1 contact position to grounded relay coil CSa. Such stepping switch may be of the general type as shown in U. S. patent to Bohlman, No. 1,569,450. When the CSa relay coil is energized, it causes its contacts CSa2—9 to be tripped and such contacts will remain closed until they are mechanically restored. The construction of such relay contacts is similar to the column shift relay unit fully shown and described in patent to G. F. Daly No. 2,045,437, dated June 23, 1936.

*Setting up of multiples of the divisor on comparing units*

It was previously explained how relay coil L was energized and with such coil energized contacts L1 and L2 (Fig. 12b) transfer. With relay contacts L2 now closed, a circuit will be completed from the line 160, through AG2 contacts now in the position shown, thence through relay contacts L2 now transferred, to emitter 178. With such add emitter in the circuit, impulses will be transferred under control of the DRO1 readout so that digit representing impulses representing one times the DR amount are transmitted by a series of lines 182 through relay contacts L3—5 to the one divisor multiple comparing magnets 1AZ. The emitter 178 will also transmit under control of the DRO3 readout impulses representing three times the divisor amount which are transmitted by a series of lines 183 through relay contacts L6—9, to the three divisor multiple comparing magnets 3AZ.

It will be observed from Fig. 12b that with relay contacts K1 at normal position and L1 now transferred the supply line 160 will be connected to the add emitter 176 and with this emitter in circuit, impulses will be sent out under control of the DRO3, DRO6 readouts so that impulses representative of six times the divisor amount will be transmitted by a series of lines 184 through relay contacts L10—13 to the 6AZ divisor multiple comparing magnets. It will be understood that the divisor multiple side of the comparing units will receive settings representing the 1, 3 and 6 divisor multiples. The comparing units operate in the manner previously explained to make suitable settings of the brushes upon these comparing commutators.

*Comparing divisor multiples with first dividend comparison amount*

Having entered both the comparison portion of the dividend in a multiple manner into the dividend side of the comparing units and having entered the 1—3—6 multiples of the divisor in the divisor side of the comparing units, the brush devices of the comparing units receive their settings, and in the manner previously explained indicate a greater than, an equal to, or a less than condition.

Referring to Fig. 12b, top, it will be noted that the comparing unit commutators are shown sectionalized, one for each multiple. For each section there is an associated grounded relay coil, such as ICU for the 1 multiple, 3CU for the 3 multiple and 6CU for the 6 multiple. The brush action of the comparing units is adapted to prevent energization of all CU magnets relating to multiples which are higher than the comparison portion of the dividend and to permit energization of a CU magnet related to a multiple equal to or less than the comparison portion of the dividend.

Referring to Fig. 16, it will be noted that, upon comparison of the first comparison portion of the dividend —0222— with the three divisor multiples 300, 900 and 1800, the comparison portion of the dividend —0222— will be found to be less than any of the 1, 3 and 6 multiples, the one multiple 300 being the only one which is the nearest. This indicates an initial "no go" condition when a first comparison is made. It may be explained that on a comparing cycle which takes a single cycle, for example, the fifth machine cycle in the example being considered, the setup of the comparison portion of the dividend and all of the three divisor multiples is made during the first portion of a comparing cycle. However, once the divisor multiples are set up they are retained set up. Immediately after the setup is made upon both sides of the comparing units and in the same machine cycle, testing and comparing are effected, and testing is done concurrently for all multiples.

*"No go" conditions on dividing*

For such "no go" condition there is no multiple deducting operation from the dividend amount standing in the DD accumulator and such condition means that the quotient digit for such place is 0.

At the end of the first comparing cycle in which a "no go" condition was detected, circuits are closed to energize certain relays described as follows: With the relation of the divisor multiple setup and the comparison portion of the dividend in the present example, the comparing operation is effected upon the closure of cam contacts CC12 (Fig. 12b) and when such contacts close a circuit will be closed from the line 160 through cam contacts CC12, relay contacts F3, then through the commutator strips 322, 323, of the three divisor multiple comparing units via brushes 317 of these comparing units but in view of the relationship between the three divisor multiples and the comparison portion of the dividend, none of the relay coils ICU, 3CU or 6CU will be energized when a "no go" condition is detected.

After the comparing operation, the resetting of the setup of the comparison portion of the dividend on the dividend side of the comparing units is effected by energizing the reset coils 21AW, noting particularly Fig. 11. After the result of the comparison has been set up, cam contacts CC10 close (Fig. 12c), thereby completing a circuit from the line 160 through the reset coils 21AW, cam contacts CC10, thence through G3 contacts now closed, to ground. The closure of this circuit during the comparing cycle and each subsequent cycle will reset the dividend side of the comparing units.

At the end of the first comparing cycle in which a "no go" condition was detected and after the reset of the dividend side of the comparing units has been effected, cam contacts CC4 close, (Fig. 12c) thereby closing a circuit from the line 160 through relay contacts AF1 now closed, through relay contacts AP2 now closed, thence through relay contacts A4 now closed, cam contacts CC4, thence serially through the relay contacts 6CU1, 3CU1, ICU1, thence through AD2 contacts now in the position shown, relay coil AH, thence through AG3 relay contacts, through cam contacts FC16, and grounded Y relay coil, thereby energizing both the relay coils AH and Y. The closure of the relay contacts AH4 provides a holding circuit for both the Y and the AH relay through relay contacts AH4 and cam contacts CC5 back to the line 160.

Shortly after relay coil AH is energized to close its contacts AH3 (Fig. 12d), a circuit is completed from the line 160 through relay contacts F6 now closed, thence through cam contacts FC10 now closed and at rest, thence through relay contacts AE1 now in the position shown, thence through relay contacts AH3 now closed, through cam contacts CC16, thence through the SB stepping switch magnet to the ground. This magnet, upon its energization, causes the stepping of the switch arm SB1 to the 2 contact position so that, upon the closure of cam contacts CC13, a circuit will be closed from the line 160, through relay contacts F6 now closed, through cam contacts FC10 now at rest and closed, thence through cam contacts CC13, switch arm SB1 at the 2 contact position, the column shift relay coil CSb to ground. Relay coil CSb now energizing will trip its contacts CSb2—8 (Fig. 12a) closed, such contacts remaining closed during the next machine cycle.

The closure of the AH2 relay contacts (Fig. 12c) will complete a circuit when cam contacts CC6 close from the line 160, through cam contacts CC6, thence through relay contacts AH2, the M relay coil to ground. It will be recalled that the holding circuit for the relay coil M is through the contacts M1 and cam contacts CC5, thereby retaining the energization of the M relay coil over and through part of the next or sixth machine cycle. The relay coil M will close or transfer its respective relay contacts shown in Fig. 12a.

The closure of relay contacts AH1 (Fig. 12a) will complete a circuit from the line 160 through cam contacts CC20, thence through relay contacts AH1 which are in circuit connection with the second highest order DD277 accumulator magnet. Cam contacts CC20 are timed as shown in Fig. 13 to impulse this particular magnet at the 9 entry time, thereby causing a 9 to be entered in the second highest order of the DD accumulator during the sixth machine cycle so that the second highest order of DDRO now represents 9. This 9 entry is shown as 9" in Fig. 16 for cycle 6.

Referring to Fig. 16, the machine has now reached a stage of operation in which it is ready to pick-out a second dividend comparison portion for comparison with divisor multiples. The second comparison portion which is to be selected comprises the amount 2226. Such amount is selected for readout from DDRO during the sixth machine cycle by means of contacts CSb2—8 which become closed upon energization of CSb effected as previously described. The circuit need not be traced in detail since it is substantially the same as previously traced to provide for the entry of the previous comparison portion into the dividend side of the comparing units. The ultimate effect is to set up 2226 upon the various comparing units by the proper timed energization of coils 1AW, 3AW and 6AW. At the end of the sixth machine cycle, a comparison is made between the new comparison portion of the dividend and the 1, 3 and 6 divisor multiples.

*Comparing divisor multiples with second dividend comparison amount*

With the relation of the divisor multiple setup and the second comparison portion of the dividend in the preesnt example, relay coils 6CU, 3CU and 1CU will be energized. Upon the closure of cam contacts CC12 (Fig. 12b), a circuit is completed from the line 160 through cam contacts CC12, through the relay contacts F3 now closed, through the commutator strips 322, 323, of the 1, 3 and 6 divisor multiple and dividend comparing units via brushes 317 of these comparing units, and through the respective 1CU, 3CU, 6CU coils to ground.

Referring now to Fig. 12c, the energization of relay coil 6CU transfers its 6CU1 contacts and this completes a circuit when cam contacts CC4 close from line 160, through AF1 contacts now in the position shown, AP2 contacts now closed, thence through relay contacts A4 now in the position shown, through cam contacts CC4, thence through 6CU1 contacts now in the transferred position, through 6X relay coil, through AG3 contacts now closed, through the now closed cam contacts FC16, through the Y relay coil to ground. Closure of stick contacts 6X1 completes a holding circuit for the 6X and Y relay coil back to the line 160, through cam contacts CC5. It may be mentioned that the 6X relay coil is energized in the same machine cycle the commutator test is made and such relay remains energized throughout a portion of the next machine cycle or seventh machine cycle to select the 6 multiple which is to be read out from the DRO6 readout and which 6 multiple is to be subtracted from the comparison portion of the dividend.

The closure of the relay contacts 6X2—7 (Fig. 12b) connects the DRO6 readout to the entray control magnets DD277 of the DD accumulator.

The first energization of the Y relay in the fifth cycle caused the Y1 contacts (Fig. 12c) to close and upon closure of cam contacts CC15 at the beginning of the next cycle or cycle 6 in the present example a circuit is completed from the line 160 through cam contacts CC15, Y1 relay contacts to the grounded AD relay coil. The AD relay coil closes its stick contacts AD1, providing a stick circuit back to the line 160, through the AD1 contacts and cam contacts FC8 now closed.

After comparison is made with the dividend comparison portion of the DD accumulator with the 1, 3, and 6 divisor multiples and after the selected CU relays are energized, the dividend comparison side of the comparing units becomes reset in the manner previously described so that a new dividend comparison portion can be introduced therein. It will be understood that the divisor multiple side of the comparing unit retains the setup of the divisor multiples during all deducting and .9DR entering operations.

Subtractions of the selected multiple of the divisor as well as successive one divisor multiples are effected by the addition of the 9's complement thereof augmented by the elusive 1 and the subtractive entries are effected by the operation of the emitter 175 (Fig. 12b) which is now connected to the line 160 through contacts K1 and L1, now in the position shown. Such emitter will emit 9's complement impulses through the DRO3—6 readout since the latter has been selected because it represents the nearest going multiple.

Impulses flow out of this readout through the lines 184 (Fig. 12b) thence through 6X2—7 relay contacts now closed, wires 185, thence through relay contacts M11—16 (Fig. 12a) now in the position shown, thence through the CSb2—8 relay contacts now closed thence via lines 164 to relay contacts M3—10 now in the position shown and through such contacts, thence by a series of impulse lines 163 to the DD277 accumulator magnets and in the proper columnar orders of the DD accumulator. Thus, as shown in Fig. 16, the 9's complement of the selected 6 divisor multiple 819999 will be added to the amount now in the DD accumulator. The line designated 184a (Fig. 12b) is the impulse line which directs the 9's complement of the 8 digit representation of the highest order of the DRO3—6 readout, which digit entry is directed through the relay contact 6X3, and by following the circuit connections from wire 185a it will be observed that this is directed to the third highest order position of the DD accumulator. From the wire 185a which directs this impulse, it will be noted that there is a branch connection 186 connected to a line 162 and this impulse then passes through the AG1 contacts now closed to the magnet 133 of the DD accumulator. It will be recalled, observing particularly Fig. 7, that this magnet releases the carry mechanism for the units order so that at the carry time the elusive 1 will be added to the lowest order of the DD accumulator, thus converting the 9's complement to the tens complement. It will be understood that the transfer mechanism of the accumulator will provide for transfer to higher orders when required.

*Entry of quotient digit related to the 6 multiple*

The selection of the 6 divisor multiple causes the entry in the proper quotient receiving order of DD of a digit which, in the present machine, comprises the digit 5 which due to the regular carry mechanism of the accumulator is subsequently augmented to the digit representation 6 in a manner which will be evident later on. There will now be described the means for effecting this 5 digit impulse. Since the highest order of the DD accumulator which receives the first quotient digit should represent 0 because of the previous "no go" condition, the second highest order will receive this 5 digit entry.

Since contacts K1 and L1 are now normal, emitter 175 (Fig. 12b) is connected to the current supply 160. When the brush of this emitter strikes the 5 impulse point, this impulse is directed to a wire 187 (Fig. 12b) which impulse passes through the 6X2 contacts now closed and by tracing the circuit connections it will be observed that the impulse passes through the M11 contacts now closed, thence through relay contacts CSb2, thence by a connecting wire 164 through relay contacts M4 now closed, and by a wire 163 to the DD277 accumulator magnet of the second highest order, thereby effecting the entry of the 5 in this order as will be observed in Fig. 16 where it is designated 5'. This 5 entry is effected in the same machine cycle that the complement of the 6 divisor multiple is subtracted.

*Overdraft detecting mechanism*

After each subtractive entry, whether subtraction is effected for the selected divisor multiple or the successive one divisor multiples, there is a test of a certain order of the dividend accumulator to determine whether it represents 9 and hence an overdraft condition. However, when a selected divisor multiple is subtracted, since it is always equal to or less than the comparison portion of the dividend, this subtraction will not directly place the dividend accumulator in a negative or overdraft condition. However, the 9 test is nevertheless made but will be ineffective in its control. The manner in whch the 9 test is performed will now be described so as to more clearly understand its control when the accumulator in an overdraft condition. When the first selected divisor multiple is subtracted in the present example the CSb relay coil is energized to thereby close its contacts CSb9 (Fig. 12a) and contacts CSb1 (Fig. 12b). When cam contacts CC11 close, which is after each subtractive entry, a circuit is closed from the line 160 through relay contacts A3, (Fig. 12a) thence through the FC6 cam contacts now closed, through cam contacts CC11, through relay contacts CSb9 now closed, through contacts 142 which are now closed because the third highest order of the dividend accumulator which controls the related contacts which is now tested is now at 0, thence through the brush and common contact segment of the third highest order of the DDRO, thence by wire 158₃ (Fig. 12b) to relay contacts CSb1 now closed, through the AF relay coil to ground. Since the third highest order position of DDRO is at 0 after subtracting the selected six divisor multiple (see Fig. 16), this circuit will not be completed so that relay coil AF will not be energized. Hence, relay contacts AF1 (Fig. 12c) remain in the position shown so that upon the next closure of cam contacts CC4, after cam contacts CC5 open to break the stick circuit for the selected 6X and Y relays a circuit will then be completed through the 1X and Y relay coil in the following manner: from line 160, through relay contacts AF1 now in the position shown, through relay contacts AP2 now closed, through the A4 relay contacts now in the position shown, through cam contacts CC4, thence serially through the contacts 6CU1, 3CU1, 1CU1, the now transferred AD2 contacts, through the 1X relay coil, through the AG3 contacts, through cam contacts FC16, through the Y relay coil to ground. The energization of the 1X relay coil will cause the one divisor multiple to be subtracted from the comparison portion of the dividend accumulator in the following manner: This, as outlined in Fig. 16, is accomplished during the eighth machine cycle and the subtraction is effected under control of the DRO1 readout, impulses being transmitted under control of this readout by the emitter 177 (Fig. 12b) since the latter is still connected to the current supply 160.

Impulses flow out of this readout through the lines 167, thence through connected lines 166, through the 1X2—6 relay contacts now closed, lines 165, thence through relay contacts M11—16 (Fig. 12a) now in the position shown, thence through CSb2—8 relay contacts now closed, thence via lines 164 to relay contacts M3—10 now in the position shown and through such contacts, thence via a series of impulse lines 163 through the DD277 accumulator magnets and into the proper columnar orders of the DD accumulator. Thus, as shown in Fig. 16, the 9's complement of the one divisor multiple, will be added to the amount standing in the DD accumulator, the elusive 1 entry being effected in the following manner: The impulse which is transmitted by the emitter 177 at the 9 time is directed by the wire 167₉ (Fig. 12b) and this impulse is directed through the contact 1X2 to a wire 162 (Fig. 12a), the circuit then leading through the AG1 contacts now closed to the magnet 133 of the DD accumulator. It will be remembered that this magnet releases the carry mechanism for the units order of the DD accumulator, so that, at the carry time, the elusive one will be entered into the lowest order of the DD accumulator, thus converting the 9's complement to the 10's complement. It will be understood that the regular transfer mechanism of the accumulator will provide for transfer to higher orders when required.

Hence, during the eighth machine cycle in the problem adopted there is a subtractive entry of the one divisor multiple in the manner just explained from the amount in the DD accumulator.

Again, after the subtractive entry a test for the presence of 9 in the third highest order position of DDRO is again effected in the manner previously explained.

The third highest order position of DDRO still represents 0 so that the test for the presence of 9 still fails to energize relay coil AF. Thereafter, there will be effected another subtraction of the one divisor multiple which is effected in the manner just described and which occurs during the ninth machine cycle. From Fig. 16 it will be noted now that the DD accumulator now represents —06982600—, the 9 in the third highest order position of the DDRO indicating that the accumulator is now in an overdraft condition.

At this time it should be explained that a "9" digit in the order sensed for overdraft may be due to the addition of digits which would bring this order to directly represent "9," or such order may represent "8" after the addition of digits, and the "representation of '9'" is made by the carry of a unit from the next slower order. It is preferable to sense for this overdraft before the carry is mechanically effected so that at times "8" would indicate an overdraft in the selected order.

Before the carry is effected the carry lever 130 of the order sensed for an overdraft (Fig. 14) would have been tripped to close contacts 143 and open contacts 142. Hence, with this contact position it will be observed that for the selected order the overdraft detecting circuit would be through the CS relay contacts related to the order sensed, (Fig. 12a) contacts 143 now closed by the carry lever of the same order, to the brush of DDRO of the selected order now at the "8" digit position, to one of the lines 158, the circuit to energize AF relay being the same as described before.

It should be explained that upon the subtraction of the one divisor multiple the first time that the regular carry mechanism for the DD accumulator carries across to the second highest order so that the "5" previously therein now represents "6" but is still the incomplete second quotient digit. When the DD accumulator represents an overdraft condition, nine-tenths of the divisor amount is then subtracted, and the subtraction of the one divisor multiples is terminated.

Before it is described how nine-tenths of the divisor amount is added to the amount in the dividend accumulator, there will be described the operations which take place in the cycle before this .9DR entry operation is effected, this cycle being machine cycle 9 in the example assumed.

Since the test for 9 indicates an overdraft condition, relay coil AF (Fig. 12b) will be energized in the manner previously described and relay contacts AF5 (Fig. 12b) close so as to provide a stick circuit for relay coil AF through such relay contacts and cam contacts CC21 back to the supply line 160.

The transfer of contacts AF1 (Fig. 12c) prevents a circuit from being closed to the IX relay and Y relay when cam contacts CC4 close. Relay contacts AF2 (Fig. 12d) close so as to cause the completion of a circuit from line 160, through relay contacts F6 now closed, cam contacts FC10 now at rest and closed, thence through the AE1 relay contacts now in the position shown, thence through the relay contacts AF2 now closed, cam contacts CC16 and grounded stepping switch magnet SB. This magnet, upon its energization, causes the stepping of the switch arm SB1 to the 3 contact position so that upon the closure of cam contacts CC13, a circuit will be closed from the line 160 through relay contacts F6 now closed, through cam contacts FC10 now at rest and closed, thence through cam contacts CC13, switch arm SB1 at the 3 contact position, the column shift relay coil CSc, to ground.

The opening of the relay contacts AF4 (Fig. 12c) prevents the completion of a circuit through the M relay coil upon the closure of cam contacts CC6 due to the fact that, as will be subsequently described, relay contacts AK1 are closed at this time. Relay contacts AF4 are in the nature of safety contacts to prevent misoperations which would be caused by the energization of the relay coil M at this time.

The energization of relay coil AF causes the closure of relay contacts AF3, (Fig. 12d) thereby completing a circuit upon the closure of cam contacts CC18 described as follows: From line 160 through relay contacts F6 now closed (Fig. 12d), cam contacts FC10 now closed, thence through cam contacts CC18, relay contacts AF3 now closed, thence through AE2 contacts now in the position shown, thence through the grounded AG relay coil. The relay coil AG closes its contacts AG4, extending the stick circuit back through such relay contacts and cam contacts CC17, thence through cam contacts FC10 now closed and at rest, and relay contacts F6 now closed, back to the line 160. This maintains the energization of the relay coil AG so that it is extended through the major portion of the next machine cycle which, in the present example, is the tenth.

Relay coil AG opens its contacts AG1 (Fig. 12a) thereby preventing any possible impulse being transmitted to the elusive one control magnet 133 for the DD accumulator during the machine cycle the .9DR is being entered in the dividend accumulator. These contacts are also in the nature of safety contacts and another contact which is of the same type and provided to prevent possible misoperations are relay contacts AG3 (Fig. 12c). The opening of these contacts prevents any possible closure of circuits through the Y and IX relay coils upon the closure of cam contacts CC4 during the machine cycle in which an overdraft has been indicated.

Relay contacts AG2 (Fig. 12b) transfer, thereby connecting the add emitter 178 to the line 160 so that this emitter is utilized to additively enter .9DR during the next machine cycle. Relay contacts AG6—9 close to establish connections between the DRO.9 readout and the DD277 accumulator magnets so as to enable entry of this amount in a manner which will now be explained.

With the emitter 178 in circuit connection, impulses will be transmitted under control of the DRO.9 readout which are transmitted by a series of lines 171, thence through relay contacts AG6—9 now closed, thence via lines 172 through relay contacts M12—15 now in the position shown, thence through relay contacts CSc2—7, certain of the lines 164, thence through certain of the relay contacts M3—10 now in the position shown, via the set of lines 163 to particular ones of the DD277 accumulator magnets. The closure of the relay contacts CSc2—8 enables the entry of .9DR to the proper orders of the DD accumulator, as is outlined in Fig. 16.

The above operation will introduce nine-tenths of the amount of the divisor into the dividend accumulator. The effect of this is the same as adding in the amount of the divisor and again subtracting it in shifted-over columnar relation in the dividend accumulator. This reduces the number of cycles of operation after each overdraft, which feature is well known and fully shown and described in the patent to J. W. Bryce et al., No. 2,165,220. After this operation is completed there is again a sensing of the dividend accumulator to determine whether or not the accumulator has gone back of 0 or represents an overdraft condition by sensing of "9" in the next or fourth highest order of DDRO, selected by the closure of relay contacts CSc8 (Fig. 22a) and CSc1 (Fig. 22b).

The closure of these contacts correlates the overdraft detecting mechanism with the fourth highest order of DDRO and such overdraft detecting mechanism operates after the addition of .9DR in the usual manner. From Fig. 16, it will be noted that after the addition of this amount the amount in the dividend accumulator has been restored to a positive condition, indicated by the 0 in the fourth highest order of DDRO. Hence, while the overdraft detecting mechanism functions it will not cause the energization of the relay coil AF and the next operation will cause the setting up of a new comparison portion of the dividend, which is read out from DDRO from orders thereof determined by the contacts CSc2—7. This new comparison portion comprises, as shown in Fig. 16, the amount —0960— which is set up on the dividend side of the comparing units.

Introduction of quotient to the dividend accumulator

The manner in which the quotient amount becomes set up in the higher orders of the dividend accumulator reserved for such entry is similar to that explained in detail in the patent to J. W. Bryce, et al. No. 2,165,220.

In general, it is stated that the quotient amount is introduced into the dividend accumulator by the carryover mechanism of the accumulator itself in the columns to the left of the dividend amount and by referring to Fig. 16 it will be seen that the quotient ultimately becomes introduced into columns of the accumulator upon which the dividend amount previously stood.

It will be noticed in Fig. 16 that, upon the second subtracting operation, that is, the subtraction which is effected of the one divisor multiple after the six divisor multiple has been selected by the comparing unit, and the 5 quotient digit entered, there is a carryover of 1 by the usual carryover devices in the dividend accumulator to the second highest order of DD. This figure "6" represents the quotient up to this point. The next subtraction of the one divisor multiple causes the dividend accumulator to represent a negative condition but at this point there is no carryover to the highest order and the quotient digit still remains 6 up to this point. However, upon the next additive entry of .9DR, the regular carry mechanism of the dividend accumulator functions to transfer across to change the previous 6 quotient digit representation to 7 and this represents the second quotient digit. This digit representation remains in the second highest order of the dividend accumulator irrespective of the subsequent operations which take place for the determination of the remaining quotient digits.

There will now be explained the operations which take place for the determination of the remaining quotient digits but these will be briefly explained since they are merely repetitious of those operations which have been previously described in detail.

Determination of remaining quotient digits

In the next cycle of machine operation, which is the eleventh in the present example, there is a setup of the new comparison portion of the dividend in the dividend side of the comparing units and from Fig. 16 this amount is —0960— which is compared with the divisor multiples 300, 900 and 1800. The operation of the comparing units determines that the 300 and 900 multiples are less in magnitude than the comparison portion of the dividend and therefore the ICU and 3CU relays are energized in the manner previously described. These relays close their respective contacts ICUI and 3CUI so that upon the closure of cam contacts CC4 (Fig. 12c) a circuit is closed to effect the energization of the 3X relay and the Y relay by circuits previously described in detail.

In the manner previously described the selected three divisor multiple is subtracted from the DD accumulator as is outlined in Fig. 16 and this takes place during the twelfth cycle of machine operation, or the cycle subsequent to the comparing cycle. The entry is effected by the emitter 177 which directs impulses under control of the DRO3 readout, now through the 3X2—7 contacts now closed and to the 277DD accumulator magnets. This entry circuit has been previously traced in detail but for a better understanding it will be stated in detail that the impulses are transmitted from the DRO3 readout to impulse lines 183, thence through connected transmitting lines 189 through contacts 3X2—7 now closed, wires 193, contacts M11—16, thence through contacts CSc2—7, wires 164, contacts M3—10, wires 163 to the proper DD277 accumulator magnets.

In the same machine cycle, the quotient digit 2 is entered in the third highest order of the DD accumulator and this digit entry is designated 2' (Fig. 16). When the brush of emitter 175 strikes the 2 index point, an impulse is directed to a wire 190, (Fig. 12b) which impulse extends through the 3X2 contact, thence by a wire 193b, through the M11 contacts, thence through the CSc2 contacts, M5 contacts, and by tracing the subsequent circuit connection it will be noted that this impulse is transmitted to the DD277 accumulator magnet of the third highest order. This 2 entry is designated 2' in Fig. 16 for cycle 12.

The wire transmitting the impulse which is read from the highest order of the DRO3 readout is designated by reference numeral 189a (Fig. 12b) and this impulse passes through the 3X3 contacts to a line 193a. It will be noted that this line is connected to the wire connection 186 which extends a circuit connection through the AG1 contact and the DD133 elusive 1 entry control magnet. The energization of this magnet will effect the entry of the elusive 1 during the twelfth cycle of machine operation when the selected three divisor multiple is subtracted from the amount in the dividend accumulator.

In the manner previously described the overdraft detecting mechanism tests for the presence of 9 in the fourth highest order position of DDRO and since the accumulator is still in a positive condition indicated by a zero in this order (see Fig. 16) relay coil AF fails to energize. Thereafter, during the thirteenth machine cycle, there is a subtraction of the one divisor multiple followed by a test for an overdraft condition in the fourth highest order of DDRO whereupon the operation of the overdraft detecting mechanism detects the presence of a 9 in the fourth highest order of DDRO.

Accordingly, there will result the energization of the AF relay so that there will be effected the energization of the SB (Fig. 12d) stepping switch magnet which causes the switch SB1 to move to the fourth contact position and causing the energization of the column shift relay coil CSd. The AG relay coil will also be energized to cause the closure of contacts AG6—9 (Fig. 12b) so as to connect the DRO.9 readout to the DD277 accumulator magnet. During the next machine cycle which is the fourteenth in the problem adopted there is an addition of .9DR to the amount in the dividend accumulator, the entry being effected in the proper denominational orders determined by the closure of relay contacts CSd2—6 (Fig. 12a).

In the following machine cycle or the fifteenth machine cycle, there is a setup of a new comparison portion of the dividend in the comparing units on the dividend side thereof and in the present problem this consists of the amount —3033— which is compared with the divisor multiples and since the one divisor multiple is equal to the compared amount, the comparing operation effected by the comparing units results in the energization of the ICU relay magnet which causes the selected one divisor multiple to be subtracted from the amount in the dividend accumulator during the sixteenth machine cycle. The failure to find the dividend accumulator in an overdraft condition will cause the one divisor multiple to be again subtracted from the amount in the dividend accumulator which is effected during the seventeenth machine cycle. In this cycle, the overdraft detecting mechanism operates and senses the presence of a 9 in the fifth left hand order position of DDRO. In previous machine operations, upon the detection of an overdraft condition, .9DR is added to the amount in the dividend accumulator but when the number of quotient digits have been secured which are determined by place limiting devices to be subsequently described, the sensing of an overdraft condition, upon securing the last quotient digit, causes the one divisor multiple to be added to the amount in the dividend accumulator instead of the subtraction of .9DR. Therefore, upon the next computation, instead of introducing nine-tenths of the divisor into the dividend accumulator, the mode of operation is changed to introduce the divisor itself into the dividend accumulator and in non-shifted columnar relation therein. Note the introduction of 300 in the last computation shown in Fig. 16 and effected during the eighteenth machine cycle. The purpose of this is to obtain the final digit of the quotient —0742— and the true value of the remainder or —0000—. This form of computation is the same as for the dividing machine shown in Patent No. 2,165,220 but since the circuits herein are different from the circuits shown in the patented machine, they will now be described in detail:

*Place limiting mechanism for controlling number of quotient digits*

The present machine provides for a presetting operation so that for any given computation within the limits of the capacity of the machine the quotient can be carried out to a predetermined number of places.

The number of quotient digits which are secured is controlled and determined by a plug connection made between the plug socket 271 and also one of a plurality of plug sockets 270 (Fig. 12d). In the present example it is assumed that four quotient digits will be secured so that accordingly the plug connection will be made to the 4 plug socket of the series 270. This control not only terminates dividing operation but institutes the addition of the DR amount in the last cycle of the dividing computation as will be subsequently explained. When the machine goes through the thirteenth cycle of operation which senses the overdraft, it will be recalled that the switch arm SB1 is shifted to the next or 4 contact making position. The switch arm SB1 has also connected therewith a supplemental switch arm SB2 movable step by step concomitantly with the switch arm SB1 and when the latter moves to the contact position corresponding in number to the number of quotient digits, the relay AE will be energized. In the assumed example, four quotient digits are desired so that when switch SB2 moves to the 4 contact position, a circuit will be closed from the line 160, through relay contacts F6 now closed, thence through cam contacts FC10 now closed, thence through cam contacts CC14, through the switch arm SB2 at the 4 contact position, thence from the 4 plug connection of the series 270, thence through the plug connection to the plug socket 271, through relay coil AE to ground. Relay coil AE closes its contacts AE1, thereby providing a holding circuit for the relay coil AE, through such contacts, cam contacts FC10 and relay contacts F6, back to the line 160. The transfer of the AE1 contacts also disconnects the line 160 from the circuit which includes the AF2 contacts and cam contacts CC16, so that even though relay coil AF may be subsequently energized the closure of cam contacts CC16 will prevent false impulses from being transferred to the stepping switch magnet SB, thereby retaining the switch arms SB1 and SB2 in the last position.

During the seventeenth cycle of machine operation that the subtraction of the one divisor multiple causes the dividend accumulator to be in a negative or overdraft condition, this condition is indicated by the sensing of 9 in the fifth left hand position as shown in Fig. 16. It will be remembered that this will result in the energization of the relay coil AF and by the joint control of the previously energized relay coil AE and the now energized relay coil AF, the addition of the one divisor multiple to the negative amount in the dividend accumulator is effected.

Attention is directed to the fact that the energization of the IX and Y is a prerequisite to establishing circuit connections between the DRO1 readout and the DD accumulator to add the divisor multiple and this is effected at the present time by a circuit connection which is somewhat different from that previously outlined for effecting the energization of the IX and Y relays. Recalling now that the AF relay is energized, the circuit will be closed from the line 160 to AF1 contacts (Fig. 12c) now transferred, thence through AE3 contacts now closed, due to the previous energization of the AE relay coil, thence through contacts AD2 now closed, thence to the IX and Y relays.

*Addition of divisor multiple*

At the end of the seventeenth cycle, cam contacts CC18 close, thereby closing a circuit from the line 160, through relay contacts F6, (Fig. 12d) cam contacts FC10, thence through cam contacts CC18, relay contacts AF3 now closed, relay contacts AE2 now transferred, thence through relay coil AJ to ground. Relay coil AJ closes its contacts AJ1, thereby providing a stick circuit through relay contacts AJ1 and cam contacts CC17, thence through cam contacts FC10 and relay contacts F6, back to the line 160. This maintains the energization of the AJ relay during the greater portion of the next cycle which is cycle 18 in the present example during which cycle the additive entry of the one divisor multiple is effected in the DD accumulator. Relay coil AJ will transfer its AJ3 contacts (Fig. 12b) so that the line 160 is now connected through the transferred AJ3 contacts to add emitter 178. With this emitter in operation, impulses will be set under control of the DRO1 readout and transmitted by lines 167 and lines 166 through relay contacts IX3—5 which are now closed, thence by the connected wires 165, through relay contacts M11—16, thence through certain ones of the relay contacts CSd2—5, wires 164, thence through contacts M3—10, thence through wires 163 to the proper orders of the DD277 accumulator magnets. The result of this action is that the amount of the divisor, that is, 300 in the illustrated computation is additively entered into the dividend accumulator. When the machine operates to read out the true amount of the divisor itself, instead of the .9 divisor amounts, the quotient computing operation of the machine is terminated.

During the last cycle of the computation in which the DR amount is added into the dividend accumulator, the overdraft detecting mechanism operates in the usual manner, but this does not result in the energization of the AF relay coil. However, further divisor subtracting operations are prevented by the following described circuit: When the impulse is transmitted to energize the AJ relay coil (Fig. 12d) the same impulse is directed through the pickup coil P of the grounded relay coil AP. Relay coil AP will close its stick contacts AP1, thereby extending the holding circuit for the hold relay coil H back through AP1 contacts, cam contacts FC10 and relay contacts F6 to line 160. Relay coil AP will open its contacts AP2 (Fig. 12c), thereby opening the impulsing circuit for the IX and Y relays at the end of the eighteenth cycle even though AF relay should not be energized and its contacts AF1 are now in the position shown. This control terminates dividing operations and the machine is then ready to record the quotient and remainder.

Quotient recording

The machine has now reached the stage of its operation in which it is ready to record the quotient on the record. Before recording is effected there must be a change in the readout relation between DDRO and the punch according to the entry shift which was previously made upon entry of the divisor and dividend amounts. At this time, there will now be described the electrical operations which are effected in the machine cycle subsequent to that in which the DR amount was additively entered in the DD accumulator.

When cam contacts CC3 (Fig. 12d) close during this entering cycle, a circuit is closed from the line 160, through RC2 contacts now closed and at rest, thence through relay contacts AJ2 now closed, cam contacts CC3, through relay coil AL to ground. Relay coil AL closes its holding contacts AL1, thereby providing a stick circuit for relay AL, through relay contacts AL1 and cam contacts RC2 back to the line 160. AL remains energized over through the next machine cycle so that upon the closure of cam contacts CC7 (Fig. 12c) a circuit is closed from the line 160, through cam contacts CC7, (Fig. 12c) relay contacts AL3 now closed, thence through the J relay coil. Relay coil J closes its relay contacts J1 (Fig. 12c) left side, thereby closing a circuit from the line 160, through relay contacts J1, thence through grounded relay coils AB and A in multiple connection, energizing both of these relays. Relay coil A closes its stick contacts A1, thereby providing a stick circuit for both relay coils A and AB, through stick contacts A1, relay contacts B2 now closed back to the line 160. Relay contacts A3 (Fig. 12a) are opened by the relay coil A, thereby rendering the overdraft detecting mechanism inoperative during quotient recording operations to prevent false circuits from being closed. Relay contacts A4 (Fig. 12c) are also opened and such contacts are in the nature of safety contacts to prevent closure of false circuits.

The manner of effecting quotient recording operations is similar in many respects to that shown and described in the patent to J. W. Bryce et al., No. 2,165,220 and particularly in the respect that in punching the quotient result provision is made for controlling the placing of the quotient result on the card so that it is placed thereon in proper columnar relation to cause the quotient result to be properly denominated. In recording quotient results on the card, the number of places to which the quotient is to be computed will affect the location of quotient recording and accordingly provision must be made to selectively locate the position of quotient recording in accordance with the number of places to which the quotient is to be computed.

It will be further recalled that when entering the divisor and dividend in the machine there was a shift of the divisor and dividend which, in the present example, resulted in the energization of relay coil Wu and relay coil Vth (Fig. 12d). The shift of the recording of the quotient result is controlled by such relays effected specifically by the selective energization of the AA and Z relays shown in Fig. 12d. The previous energization of the Vth and Wu relays causes the closure of the respective Vth2 and Wu2 contacts so that when the A2 relay contacts close a circuit will be closed from the line 160 through relay contacts A2, through the Vth2 contacts and the Zth relay coil to ground and a circuit is also extended to the Wu2 contacts through the AAu relay coil to ground. Energization of these relays causes their related Zth1 contacts and AA1 contacts to close and complete a stick circuit for their relay coils back through the A2 contacts to line 160.

Referring to Fig. 12c, it will be noted that there is a column shifting arrangement intermediate plug sockets 154 and a series of lines 157 which extends to the DDRO readout and this column shift arrangement consists of contacts controlled by the AA and Z relays. The plug sockets 154 have plug connections to plug sockets 155 which are the punch readout strip sockets. With relay coils AAu and Zth energized, there will be a closure of the relay contacts AAu2—12 and Zth2—12 and the closure of these contacts in combination will establish a readout relation between DDRO and the sockets 155 so that there will be a punching in the card located with respect to the decimal point line designated "D" in Fig. 12c. Hence, by the selective energization of the AA and Z relays there will be a shift of the recording of the quotient result to the left or right. It is to be further understood that the machine can be selectively adjusted so that a predetermined number of quotient digits may be secured and recalling that quotient recording is effected under control of DDRO, it will be noted that six higher orders at the left have been allocated for quotient recording and obviously if a fewer orders are utilized for quotient digit computations, the orders to the right of the selected number, if any, should be recorded as zeros.

In the present machine, the recording of zeros for such places and the cutout of the control by the DDRO accumulator for the corresponding orders are effected to provide for the elimination of recording of any of the digits of the remainder which may be represented in such orders.

It is to be further understood that orders to the right and left of the decimal point, if not recorded to represent quotient digits standing on DDRO, should also be recorded as zeros so that the complete card field for quotient recording can be punched in all card columns irrespective of the location of the digits of the quotient result derived from DDRO.

Cutout of recording of remainder and automatic recording of zeroes determined by the place limiting device The common segments for the six left hand orders of DDRO extend by six wire connections 158 (Fig. 12a), these six wire connections also being shown in Fig. 12b and intermediate the six wire connections designated 157 and the six wire connections designated 158 are contacts controlled by relays PLa, PLb, PLc, PLd and PLe, which relays are selectively energized in accordance with the number of quotient digits to be secured. The selective energization of such relays is effected by the switch arm SB2 (Fig. 12d), it being noted that when the switch arm is at the 1 contact position, PLa is energized, and at the 2 contact position PLb is energized, etc., up to the fifth contact position when the relay coil PLe is energized. At the sixth contact position, none of the relay coils PL is energized which indicates that the limiting number of quotient digits, namely 6, are to be derived so that all of the six left hand quotient representing orders of DDRO are to be read out. In the present example, four digits are to be derived so that the relay coil PLd will be energized to thereby transfer its contacts PLd1—2. The relay contacts PLd1—2 enable the recording of the quotient digits directly from the four extreme left hand orders of DDRO but the transfer of contacts PLd1—2 cut out the recording for the next two lower orders of digits on DDRO and at the same time connect the zero recording magnet to the punch machine so that for these two orders zeros will be recorded.

This will be better understood by understanding that when six quotient digits are to be recorded there is a direct connection between the lines 158 from the six higher orders of DDRO to the six quotient recording lines 157, the circuit being closed from one line to the respective connecting line through the normally closed serially connected contacts. When five quotient digits are desired, relay coil PLe energizes to transfer contacts PL1, thereby disconnecting the sixth left hand order of DDRO from the punch reading strip but connecting the punch reading strip for the related column position to a zero source line 145 which is shown in Figs. 12b and 12a, and as shown in Fig. 12a is connected to the zero recording magnet of the series of punch selecting magnets 146 through contacts AB11. During punching operations, relay coil AB is energized in the manner previously described, thereby connecting the DDRO through such contacts to the punch selecting magnets 146 of the punching machine.

However, if the machine should be conditioned for deriving four quotient digits, relay coil PLd is energized, thereby enabling the four higher orders of DDRO to be connected to the related column positions of the punch reading strip, whereas the transfer of contacts PLd1—2 will connect the next two lower column positions of the reading strip to the zero recording source line 145. In the same manner the selective energization of the other relays will enable the orders of the DDRO reserved for such quotient digit representation to be connected to control the punch whereas the remaining lower orders of DDRO are disconnected from the punching machine and for such orders the column recording positions of the punching machine are connected to a zero recording source.

It will be understood, therefore, that differentiating from the quotient recording mechanism shown in the patent to J. W. Bryce et al., 2,165,220, the present machine eliminates the recording of the remainder and for corresponding column positions zero punching is effected.

However, the place of quotient recording for the six column positions from DDRO is determined by the selective energization of the AA and Z relays and shifting of the recording is effected with regard to the decimal line D (Fig. 12c) on the card in the same manner as explained in the patent referred to.

For recording of zeros in the column positions to the left of the decimal line D, if such column positions are not utilized for recording quotient digits, zero recording is effected and it will be observed that the zero recording source line 145 extends as shown in Fig. 12c, to be connected with certain of the contacts controlled by the Z relays to thereby supplement quotient recording by zeros at the left hand column positions of the card.

The punch selecting circuits will be traced generally for punching the one column. It will be observed that the punching circuit extends from the line 160 through contacts B2 now closed (Fig. 12c), thence through A1 contacts now closed, thence through cam operated contacts 215 (see also Fig. 2a) which are the well known floating contacts of the punching machine of the type utilized (see also Fig. 2a) the circuit then extending through the punch emitter common strip 222, the brush 223 of the readout strip and contact points 224 engaged by brush 223, to the plug hubs 155, the plug connection to plug sockets 154, thence through the AAu2—12 contacts, thence through the Zth2—12 contacts, thence by lines 157 through the contacts controlled by the PL relays, thence by wires 158 (see Fig. 12a) to the common segments of DDRO, thence through the brushes at the column position of the orders being read out, thence through the related relay contact of the series AB1—11, to the selected punch interposer control magnets 146 to ground. The energization of any interposer magnet 146 closes the punch magnet contacts 259 (Fig. 12c) and energizes the punch magnet 260 in the usual manner. Punching then proceeds in the usual way, column by column and eventually the card reaches the last column position provided for punching the last card column of the field reserved for recording the quotient result. By means of the usual skipping mechanism provided in the punching machine of the type being described, the punching machine skips to the extreme left hand column position and at such position contacts P5 close (Fig. 12c) to effect the energization of relay coil B by an obvious circuit connection.

Relay coil B closes its contacts B1 (Fig. 12c left), thereby closing an obvious circuit to the eject magnet 232 of the punching machine. (See Fig. 2a.) Card ejection then occurs to remove the punched card from the punching machine.

It may be explained that with the present embodiment punching operations occur during one or more cycles of the dividing machine and with the normal punching speed of the punching machine result punching may take place during at least two cycles of the operation of the dividing machine. During the following cycle the conditioning of the machine to effect resetting of the different entry receiving devices and accumulators is effected in the following manner: When the ejection of the card occurs in a machine cycle following the two cycles during which punching operations are effected, the relay coil B is energized to also close its contacts B3 (Fig. 12c, right) closing a circuit from the line 160 through the 21DD, 21DR3—6, 21DR1, 21DR.9 reset magnets, thence through cam contacts CC8, then through relay contacts B3 now closed, thence through AL2 relay contacts now closed, relay contacts G3 now closed, to ground. When cam contacts CC8 close during this cycle following completion of punching operations, these reset coils will be energized to thereby reset their respective entry receiving devices and accumulators during the next or reset cycle. Also during the cycle following completion of punching cam contacts CC9 close (Fig. 12c, right) so as to complete a circuit from the line 160 through 21AZ reset magnets, thence through cam contacts CC9, relay contacts B3, AL2, G3 to ground. These reset magnets now having been energized will enable the resetting of the divisor side of the comparing units during the reset cycle.

Relay contacts B2 (Fig. 12c, left) open to thereby open the holding circuit for the A and AB relay coils.

Card feed of a new card is brought about by the resetting of the DR3—6 entry receiving device by a cam on the reset shaft thereof which operates to close contacts RC1 and open contacts RC2 (Fig. 1). Upon the closure of cam contacts RC1 (Fig. 12c, left), a circuit is closed from line 160 through RC1 contacts, thence through grounded relay coil E. The manner in which card feeding operations are effected upon the energization of the relay coil E has been described in detail in the preceding description but it is well to understand at this time that the relay coil E closes its contacts E2, thereby transmitting an impulse to the card feed clutch 204. Hence, a subsequent card feed cycle will ensue in which a following card will be fed for controlling subsequent dividing computations.

Cam contacts RC2 open during the reset cycle to deenergize the AL relay coil which opens its contacts AL3 (Fig. 12c) to deenergize the relay coil J, and by opening its contacts AL2 (Fig. 12d) it will prevent repetition of resetting operations to the "21" reset coils shown in Fig. 12c, thus preventing more than one reset operation of the respective entry receiving devices and accumulators.

During the beginning of the next card feed cycle, cam contacts FC13 close (Fig. 12d), thereby closing an obvious circuit to the SBR magnet which is the release magnet for the stepping switch. In a well known manner, the energization of this magnet releases the SB1 and SB2 switch arms so that they may be spring-returned to their initial contact making position.

Inasmuch as the new computation is to follow, provision is made to deenergize the previously energized shift control relays V and W (Fig. 12d). Such deenergization is effected during the beginning of the card feed cycle upon opening of cam contacts FC5 which interrupts the stick circuits to any of the V or W relay coils which have been previously energized. This operation will place these relays in condition to be set up again under pre-sensing control of the next card. Computations proceed card by card until all computations on all cards are complete.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims:

What is claimed is:

1. In a dividing machine having a dividend accumulator, the combination of three different settable source devices from which entries representative of 1, 3 and 6 multiples of a divisor amount may be transmitted, comparing means having a series of units receiving entries transmitted from the 1, 3 and 6 divisor multiple source devices and receiving entries transmitted from the dividend accumulator for concurrently comparing for determination of the relative magnitude all the entries representative of the 1, 3 and 6 multiples of the divisor amount with entries representative of the comparison portion of the dividend, determining means controlled by said comparing means for determining and selecting which source device affording a multiple of the divisor is the greatest that is contained in the comparison portion of the dividend, transmitting means operative when all said source devices have been set to render available the 1, 3 and 6 divisor multiples to transmit entries representative from the related source devices, and entries representative of the comparison portion of the dividend from the dividend accumulator to the units of the comparing means, means cooperating with said dividend accumulator for detecting an overdraft therein resulting from successive subtractions of the 1 divisor multiple from the dividend accumulator, transmitting means for causing subtraction of the ascertained highest going divisor multiple amount derived from and under control of the selected 1, 3, and 6 divisor multiple source device from the comparison portion of the dividend in the dividend accumulator, and cyclically operable subtracting means operable after subtraction of the selected divisor multiple under control of the overdraft detecting means for successively subtracting the 1 divisor multiple under control of the 1 divisor multiple source means from the dividend accumulator until said overdraft detecting means determines that the dividend accumulator represents an overdraft condition.

2. In a dividing machine with dividend receiving means for receiving a dividend amount, an overdraft detecting means cooperating therewith, a plurality of different readout means positionable for representing the 1, and two other digital divisor multples and means for causing the readoutmeans to be set to represent such divisor multiples, comparing means comprising a series of three units, one for the 1, and each of the other two digital multiples of the divisor, and a series of three units correlated with said dividend receiving means to compare the relative magnitude of a comparison portion of the dividend with the 1, and the other divisor multiples, means for setting up under control of said readout means the three units for representing the 1 and each of the other divisor multiples and under control of the dividend receiving means the three units for the comparison portion of the dividend, means for testing the setting of each unit representing the comparison portion of the dividend against the setting of the correlated units representing the 1 and the other divisor multiples for determining the highest going divisor multiple contained in the comparison portion of the dividend, means to render available a comparison portion of the dividend receiving means for setting the related units and for concurrently correlating a higher order of the dividend receiving means not receiving a digit representation of the comparison portion of the dividend with said overdraft detecting means, means controlled by said testing means to cause the highest going 1 or one of the other divisor multiples available upon the readout means affording the aforesaid three divisor multiples, to be selected for subtraction and for connecting the selected readout means to the dividend receiving means for subtraction, means to cause under control of the selected and connected readout means the subtraction of the highest going divisor multiple from the dividend amount in said dividend receiving means, cyclically operable subtracting means operable after the subtraction of the highest going divisor multiple to effect under control of the 1 divisor multiple readout means the successive subtraction of the 1 divisor multiple amount from the dividend receiving means, means to render said overdraft detecting means operable after each 1 divisor multiple subtraction to test the selected order of the dividend receiving means for the detection of an overdraft resulting from the aforesaid subtractions, and means controlled by said overdraft detecting means upon detecting an overdraft for terminating the operation of the cyclically operable subtracting means.

3. In a dividing machine with dividend receiving means for receiving a dividend amount and a dividend representing means set thereby, an overdraft detecting means, a plurality of different readout means positionable for representing the 1, 3 and 6 divisor multiples and means for causing the readout means to be set to represent the 1, 3 and 6 divisor multiples, comparing means comprising a series of three units, one for each of the 1, 3 and 6 digital multiples of the divisor and a series of three units correlated with said dividend representing means to compare the relative magnitude of a comparison portion of the dividend with the 1, 3 and 6 divisor multiples, means for setting up under control of said readout means the three units for representing the 1, 3 and 6 divisor multiples and under control of the dividend representing means the three units for the comparison portion of the dividend, means for testing the setting of each unit representing the comparison portion of the dividend against the correlated units representing the 1, 3 and 6 divisor multiples to determine the highest going divisor multiple contained in the comparison portion of the dividend, column shift means associated with the dividend receiving means and representing means to render available a comparison portion of the dividend representing means for setting the related units and for concurrently correlating a selected higher order of the dividend representing means not receiving a digit representation of the comparison portion of the dividend with said overdraft detecting means, means controlled by said testing means to cause the highest going 1, 3 or 6 divisor multiple available upon the readout means affording the 1, 3 and 6 divisor multiples, to be selected for subtraction and for connecting the selected readout means to the dividend receiving means for subtraction, means to cause under control of the selected and connected readout means the subtraction of the highest going multiple from the dividend amount in said dividend receiving means, cyclically operable subtracting means operable after the subtraction of the highest going divisor multiple to connect the 1 divisor multiple readout means with said dividend receiving means to effect under control of the 1 divisor multiple readout means the successive subtraction of the 1 divisor multiple amount from the dividend receiving means, means to render said overdraft detecting means operable after each 1 divisor multiple subtraction to test the selected higher order of the dividend representing means for the detection of an overdraft resulting from the aforesaid subtractions, and means controlled by said overdraft detecting means upon detecting an overdraft in such selected order for terminating the operation of the cyclically operable subtracting means.

4. A dividing machine according to claim 3 in which there is provided a nine-tenths divisor representing means, means for causing the latter to represent nine-tenths of the divisor, means rendered operable by said overdraft detecting means upon detecting an overdraft to operate said column shift means associated with said dividend representing means to select the next lower order element of the dividend representing means for overdraft detection control and to operate the column shift means associated with said dividend receiving means, means to additively enter under control of the nine-tenths divisor representing means nine-tenths of the divisor amount in said dividend receiving means in orders determined by the operation of said column shift means whereby the dividend receiving means now represents a true number remainder, means for clearing out the units representing the comparison portion of the dividend amount after the testing operation, and means rendered operable after the entry of the nine-tenths divisor amount to cause a new comparison portion of the true number remainder amount selected by said column shift means from said dividend representing means to be set on the related units by the operation of the associated setting means.

5. In a dividing machine having a dividend accumulator which latter includes transfer mechanism between successive orders thereof, and divisor receiving means, the combination of three separate different settable source devices from which amounts representative of the 1, 3 and 6 divisor multiples may be read out therefrom, comparing means having a series of three units receiving entries from each of said source devices and three units receiving an entry of a comparison portion of the dividend from said dividend accumulator, for concurrently comparing the relative magnitude of each of the 1, 3 and 6 divisor multiples with the entries representing the comparison portion of the dividend, means for setting the three units representing the 1, 3 and 6 divisor multiples under control of the divisor multiple source devices and means for setting the three units under control of the elements of the dividend accumulator representing the comparison portion thereof, said last named means including means to select and render available a comparison portion of the dividend from said dividend accumulator, an overdraft detecting means cooperating with a higher order control element of the dividend accumulator not receiving a digit representation of the dividend amount, but not comprising the highest order quotient digit receiving element, means controlled by said selecting means to correlate said overdraft detecting means with said overdraft detecting control element of the dividend accumulator, means for testing the digital representations of the 1, 3 and 6 divisor multiple representing units against each of the related units representing the comparison portion of the dividend, entry effecting means for entering a 5 quotient digit in the quotient digit receiving element upon selection of the 6 divisor multiple, or for entering 2 in such element upon selection of the 3 divisor multiple, means controlled by said testing means for selecting the source device affording a divisor multiple which is the greatest amount contained in the comparison portion of the dividend accumulator and to effect the subtraction under control of the selected source device of the selected divisor multiple amount from the comparison portion of the dividend and concurrently render said entry effecting means operable to enter in the quotient receiving element either a 2 or 5 quotient digit dependent upon the selection of the 3 or 6 divisor multiple source device, respectively, and cyclically operable subtracting means operable after subtraction of the highest going divisor multiple to effect under control of the 1 divisor multiple source device the successive subtraction of the 1 divisor multiple from the dividend accumulator until an overdraft condition is represented therein, said transfer mechanism, at times, carrying a unit to the quotient receiving element to augment the entered quotient digit by a unit.

6. In a dividing machine, dividing mechanism which includes a dividend accumulator having higher orders reserved for quotient digit entries and successive lower orders for dividend entries, certain orders reserved for dividend entries being cleared out as the dividing computation is carried out to consume the available dividend amount, and such cleared out orders then receiving quotient digit entries, and wherein the orders not receiving quotient digits may represent a part of the remainder, the combination of digit representing means of said accumulator, quotient recording means operable to record one or more digits under control of said representing means, means for reading out said quotient digit representing means to control the quotient recording means to cause the latter to record the digits represented on said representing means, a plurality of quotient digit recording selecting means, a plurality of means intermediate said reading out means and said digit representing means for normally causing a predetermined number of orders of the digit representing means to be read out by said reading out means and selectively operated by the related quotient digit recording selecting means to a position for disconnecting said reading out means from one or more orders of the digit representing means which may represent digits of a remainder which are not to be recorded, and means for selectively operating said quotient digit recording selecting means in accordance with the number of quotient digits to be recorded.

7. The structure according to claim 6 in which the quotient recording means includes zero digit recording means, and in which each of said plurality of intermediate means when operated to disconnecting position connects said zero digit recording means to said readout means for recording zeros in columns related to disconnected orders of the digit representing means.

ARTHUR H. DICKINSON.